(12) United States Patent
Wu et al.

(10) Patent No.: US 9,860,804 B2
(45) Date of Patent: Jan. 2, 2018

(54) PRIORITY MANAGEMENT OF A MEASUREMENT EVENT TIMER AND LOW-POWER PERIOD

(71) Applicant: QUALCOMM Incorporated, San Diego, CA (US)

(72) Inventors: Yongle Wu, San Diego, CA (US); Vishu Kumar, Hyderabad (IN); Amit Mahajan, Sunnyvale, CA (US); Udayan Murli Bhawnani, San Diego, CA (US); Won-Joon Choi, San Diego, CA (US); Shivratna Giri Srinivasan, Chennai (IN); Osama Nafeth Saleem Alrabadi, Bad Soden am Taunus (DE); Dominique Francois Bressanelli, Eschborn (DE); Marian Madan, Bad Soden am Taunus (DE); Mohamed Khalifa, Frankfurt Hessen (DE); Florina Andreea Prisecaru, Frankfurt Hessen (DE)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 14/537,563

(22) Filed: Nov. 10, 2014

(65) Prior Publication Data

US 2015/0133061 A1 May 14, 2015

Related U.S. Application Data

(60) Provisional application No. 61/902,657, filed on Nov. 11, 2013.

(51) Int. Cl.
*H04B 17/00* (2015.01)
*H04W 36/00* (2009.01)
(Continued)

(52) U.S. Cl.
CPC ....... *H04W 36/0088* (2013.01); *H04W 24/10* (2013.01); *H04W 76/048* (2013.01)

(58) Field of Classification Search
CPC ................ H04W 36/0088; H04W 76/048
(Continued)

(56) References Cited

U.S. PATENT DOCUMENTS

2007/0202835 A1* 8/2007 Son ................ H04W 52/0225
455/343.1
2009/0164821 A1 6/2009 Drescher
(Continued)

FOREIGN PATENT DOCUMENTS

| EP | 2787759 A1 | 10/2014 |
|---|---|---|
| WO | WO-2013017929 A1 | 2/2013 |
| WO | WO-2013097683 A1 | 7/2013 |

OTHER PUBLICATIONS

"Discussions on measurement reporting in DRX", 3GPP Draft; R4-081844, 3rd Generation Partnership Project (3GPP), Mobile Competence Centre ; 658, Route Des Lucioles ; F-06921 Sophia-Antipolis Cedex, France, vol. RAN WG4, no. Jeju; 20080826, Aug. 26, 2008 (Aug. 26, 2008), XP050180361, [retrieved on Aug. 26, 2008] section Alt 3.
(Continued)

*Primary Examiner* — Raj Chakraborty
(74) *Attorney, Agent, or Firm* — Patterson & Sheridan LLP

(57) ABSTRACT

Methods, systems, apparatuses, and devices are described for transmitting a measurement report during wireless communications. When, for example, a low-power period (e.g., CDRX OFF period) is scheduled to begin during a time defined by a measurement event timer (TTT timer), a UE may modify the low-power period. The low-power period may be modified based, at least in part on determining the low-power period of the UE will begin during a time defined by a measurement event timer, a duration of the measurement event timer, and a duration of the low-power period. Modifying the low-power period may include delaying the
(Continued)

start of the low-power state until after transmission of the MR associated with the measurement event timer or skipping the low-power period altogether. The UE may transmit the MR based, at least in part, on the modification.

30 Claims, 14 Drawing Sheets

(51) Int. Cl.
  *H04W 76/04* (2009.01)
  *H04W 24/10* (2009.01)
(58) Field of Classification Search
  USPC .................................................. 455/67.11
  See application file for complete search history.

(56) References Cited

U.S. PATENT DOCUMENTS

| | | | |
|---|---|---|---|
| 2010/0010683 A1* | 1/2010 | Kates | H02J 3/14 |
| | | | 700/293 |
| 2011/0128898 A1* | 6/2011 | Park | H04W 72/1263 |
| | | | 370/311 |
| 2013/0294307 A1* | 11/2013 | Johansson | H04W 52/0209 |
| | | | 370/311 |
| 2014/0031027 A1 | 1/2014 | Dalsgaard | |
| 2014/0086123 A1 | 3/2014 | Deivasigamani et al. | |
| 2014/0098694 A1* | 4/2014 | Damji | H04W 52/0229 |
| | | | 370/252 |

OTHER PUBLICATIONS

International Search Report and Written Opinion—PCT/US2014/064974—ISA/EPO—dated Feb. 24, 2015.
Qualcomm Incorporated: "LTE Data Communication Enhancement Proposals", 3GPP Draft; S1-112118 LTE Data Communication Enhancements, 3RD Generation Partnership Project (3GPP), Mobile Competence Centre ; 658, Route Des Lucioles ; F-06921 Sophia-Antipolis Cedex; France, vol. SA WG1, no. Dublin; 20110808, Aug. 1, 2011 (Aug. 1, 2011), XP050547659, [retrieved on Aug. 1, 2011] the whole document.
Liu Y., et al., "Optimization of discontinuous reception (DRX) operation during intra-LTE handover," Global Information Infrastructure Symposium, 2013, pp. 1-6.

* cited by examiner

PRIORITY MANAGEMENT OF A MEASUREMENT EVENT TIMER AND LOW-POWER PERIOD

CROSS-REFERENCE TO RELATED APPLICATION

This application claims of priority to U.S. Application Ser. No. 61/902,657, filed Nov. 11, 2013, which is expressly incorporated herein by reference in its entirety.

BACKGROUND

Field of the Disclosure

Aspects of the present disclosure generally relate to wireless communications, and more specifically to the transmission of measurement reports (MRs) during wireless communications.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple user equipments (e.g., mobile devices). Each base station has a coverage area, and when a UE leaves or is about to leave the coverage area of a base station (i.e., a serving cell), the UE may be handed over to another base station (i.e., a neighboring cell). To assist a base station in determining when a handover is appropriate, a user equipment (UE) may transmit measurement reports (MRs) to the base station. The MRs may include, for example, measurements pertaining to the signal strength of a serving cell, the signal strength of a neighboring cell, and/or a comparison of the signal strength associated with a serving cell and the signal strength associated with a neighboring cell.

SUMMARY

The described features generally relate to one or more methods, systems, apparatuses, and/or devices for transmitting a measurement report during wireless communications.

In some cases, a UE may operate in connected discontinuous reception (CDRX) mode. When operating in CDRX mode, the UE may cycle through alternating CDRX ON periods and CDRX OFF periods. When a measurement report is due to be transmitted during a CDRX OFF period, transmission of the measurement report may be delayed until a next CDRX ON period, or the measurement report may be discarded, or the UE may exit the CDRX OFF period prematurely (e.g., for the purpose of transmitting the measurement report). All of these scenarios may be undesirable. The methods, systems, apparatuses, and/or devices disclosed herein therefore modify the timing of the measurement report under certain conditions, and in some cases transmit the measurement report early, before entering a CDRX OFF period.

Certain aspects of the present disclosure provide a method for transmitting a measurement report during wireless communications. The method generally includes detecting a measurement event, determining that a timing of a measurement report associated with the measurement event is during a CDRX OFF period, and modifying the timing of the measurement report in response to the determination.

Certain aspects of the present disclosure provide an apparatus for transmitting a measurement report during wireless communications. The apparatus generally includes means for detecting a measurement event, means for determining that a timing of a measurement report associated with the measurement event is during a CDRX OFF period, and means for modifying the timing of the measurement report in response to the determination.

Certain aspects of the present disclosure provide an apparatus for transmitting a measurement report during wireless communications. The apparatus generally includes a processor and a memory coupled to the processor with instructions stored thereon. The instructions may be executable by the processor to detect a measurement event, to determine that a timing of a measurement report associated with the measurement event is during a CDRX OFF period, and to modify the timing of the measurement report in response to the determination.

Certain aspects of the present disclosure provide a computer readable medium for wireless communications having instructions stored thereon. The instructions are executable by one or more processors for detecting a measurement event, determining that a timing of a measurement report associated with the measurement event is during a CDRX OFF period, and modifying the timing of the measurement report in response to the determination.

Further, as detailed herein, the timeliness of a measurement report may assist the network in making handover decisions regarding a UE. Therefore, according to aspects, the methods, systems, apparatuses, and/or devices disclosed herein, a measurement event timer associated with a measurement report may be prioritized over a low-power period (e.g., over the CDRX OFF period).

Certain aspects of the present disclosure provide a method for wireless communications by a UE. The method generally includes determining a low-power period of the UE will begin during a time defined by a measurement event timer, modifying the low-power period based, at least in part, on the determination, a duration of the measurement event timer, and a duration of the low-power period, and transmitting a measurement report (MR) associated with the measurement event timer based, at least in part, on the modification.

Certain aspects of the present disclosure provide an apparatus for wireless communications by a UE. The apparatus generally includes means for determining a low-power period of the apparatus will begin during a time defined by a measurement event timer, means for modifying the low-power period based, at least in part, on the determination, a duration of the measurement event timer, and a duration of the low-power period, and means for transmitting a measurement report (MR) associated with the measurement event timer based, at least in part, on the modification.

Certain aspects of the present disclosure provide an apparatus for wireless communications by a UE. The apparatus generally includes at least one processor, a memory coupled to the at least one processor with instructions stored thereon, and a transmitter. The instructions may be executable by the processor to determine a low-power period of the UE will begin during a time defined by a measurement event timer and to modify the low-power period based, at least in part, on the determination, a duration of the measurement event timer, and a duration of the low-power period. The transmitter may be configured to transmit a measurement report (MR) associated with the measurement event timer based, at least in part, on the modification.

Certain aspects of the present disclosure provide a computer readable medium for wireless communications having instructions stored thereon. The instructions are executable by one or more processors, for determining, by a UE, a low-power period of the apparatus will begin during a time defined by a measurement event timer, modifying, by the UE, the low-power period based, at least in part, on the determination, a duration of the measurement event timer, and a duration of the low-power period, and for transmitting, by the UE, a measurement report (MR) associated with the measurement event timer based, at least in part, on the modification.

Further, the scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Transmission of measurement reports during wireless communications is described. When operating in CDRX mode, a UE may turn its radio off and/or sleep during its CDRX OFF periods. Thus, when a measurement report is due to be transmitted during a CDRX OFF period, transmission of the measurement report may be delayed until a next CDRX ON period.

On one hand, the timeliness of certain measurement reports (e.g., mobility measurement reports) may be important, and delay in transmitting the measurement reports may render the measurement reports of little or no value and cause a network to take action (e.g., initiate handover) based on measurements that no longer hold true. On the other hand, it may be imprudent to transmit a measurement report before a measurement is determined to be stable.

Aspects of the present disclosure provide methods and apparatus for prioritizing a measurement event timer over a low-power period, when, for example, the low-power period is scheduled to begin during a time defined by the measurement event timer. As described herein, the UE may modify the low-power period based, at least in part, on the determination, a duration of the measurement event timer, and a duration of the low-power period. Modifying the low-power period may include delaying the start of the low-power state until after transmission of the MR associated with the measurement event timer or skipping the low-power period. The UE may transmit the MR based, at least in part, on the modification.

Further, the methods, systems, apparatuses, and devices disclosed herein enable a measurement report to be transmitted early, before entering a CDRX OFF period. In some aspects, however, early transmission of a measurement report may be avoided so as to decrease the likelihood that a measurement report will include an unstable and/or erroneous measurement.

The following description provides examples, and is not limiting of the scope, applicability, or configuration set forth in the claims. Changes may be made in the function and arrangement of elements discussed without departing from the spirit and scope of the disclosure. Various embodiments/aspects may omit, substitute, or add various procedures or components as appropriate. For instance, the methods described may be performed in an order different from that described, and various steps may be added, omitted, or combined. Also, features described with respect to certain embodiments may be combined in other embodiments/aspects.

Figure 1:
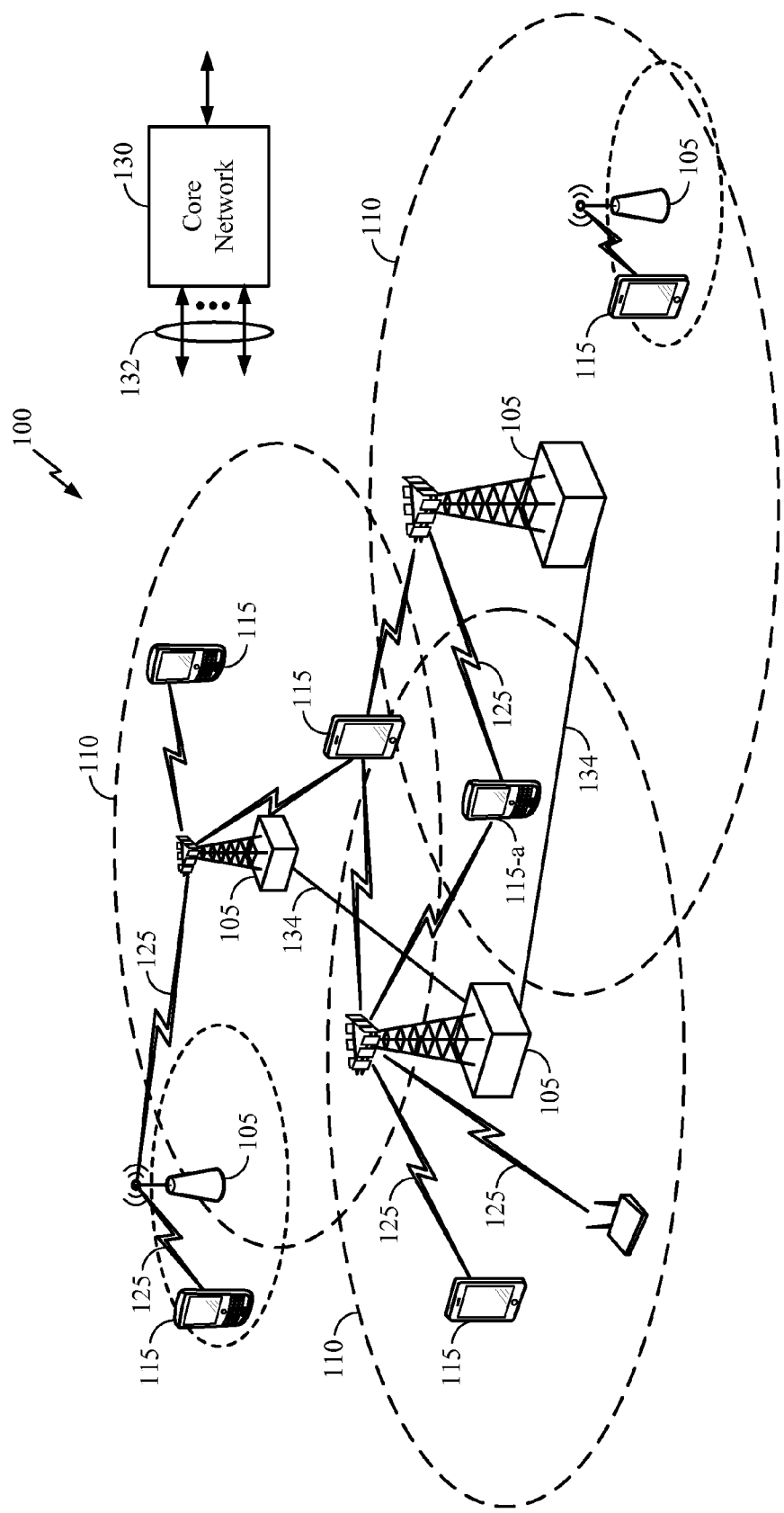
FIG. 1 shows a block diagram of a wireless communications system, in accordance with aspects of the present disclosure.

FIG. 1 illustrates an example wireless communication system in which aspects of the present disclosure may be practiced. As shown, a UE 115, 115-a of the wireless communications system 100 may sometimes operate in a CDRX mode. During a CDRX ON period, an entering condition or event for triggering a measurement report may be detected by the UE. However, the measurement report may not be ready for transmission until some future point in time, which future point in time may occur during a subsequent CDRX OFF period. When the time at which a measurement report is ready for transmission falls after the start of the CDRX OFF period, its timeliness and usefulness may be adversely affected by delaying its reporting. According to aspects, the UE may be configured to prioritize a measurement event timer over a low-power period as described herein, in an effort to transmit a timely measurement report to the network (e.g., serving base station).

Referring first to FIG. 1, a diagram illustrates an example of a wireless communications system 100. The system 100 includes a plurality of access points (e.g., base stations, eNode Bs (eNBs), or wireless local area network (WLAN) access points) 105, a number of UEs 115, and a core network 130. Some of the access points 105 may communicate with the UEs 115 under the control of a base station controller (not shown), which may be part of the core network 130 or certain access points 105 (e.g., base stations or eNBs) in various aspects. Some of the access points 105 may communicate control information and/or user data with the core network 130 through backhaul 132. In some aspects, some of the access points 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The access points 105 may wirelessly communicate with the UEs 115 via one or more access point antennas. Each of the access points 105 may provide communication coverage for a respective coverage area 110. In some aspects, an access point 105 may be referred to as a base station, a base transceiver station, a radio base station, a radio transceiver, a basic service set (BSS), an extended service set (ESS), a NodeB, an evolved NodeB (eNB), a Home NodeB, a Home eNodeB, a WLAN access point, or some other suitable terminology. The coverage area 110 for an access point may be divided into sectors making up only a portion of the coverage area (not shown). The system 100 may include access points 105 of different types (e.g., macro, micro, and/or pico base stations). The access points 105 may also utilize different radio technologies. There may be overlapping coverage areas for different types and radio technologies.

In some aspects, the system 100 may be or include an LTE/LTE-A communications system (or network). In LTE/LTE-A communications systems, the terms evolved Node B (eNB) and user equipment (UE) may be generally used to describe the access points 105 and UEs 115, respectively. The system 100 may also be a Heterogeneous LTE/LTE-A network in which different types of eNBs provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul 132 (e.g., through core network 130). The wireless communications system 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The UEs 115 may be dispersed throughout the wireless communications system 100, and each UE may be stationary or mobile. A UE 115 may also be referred to by those skilled in the art as a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communication links 125 shown in system 100 may include uplinks for carrying uplink (UL) transmissions (e.g., from a UE 115 to an eNB 105) and/or downlinks for carrying downlink (DL) transmissions (e.g., from an eNB 105 to a UE 115). The UL transmissions may also be called reverse link transmissions, while the DL transmissions may also be called forward link transmissions. To facilitate mobility, an eNB 105 may provide a measurement configuration to a UE 115 in its coverage area. The measurement configuration may include a number of measurement objects on which the UE is directed to perform measurements. The measurement configuration may define event triggers for measurement reporting and each event trigger may have associated parameters. When the UE 115 detects a configured measurement event, it may respond by sending a measurement report to the eNB 105 with information about the associated measurement objects. A time-to-trigger (TTT) parameter can be used to define how long a measurement event must persist before the UE sends its measurement report. In this way, the UE can signal changes in its radio conditions to the network.

Figure 2:
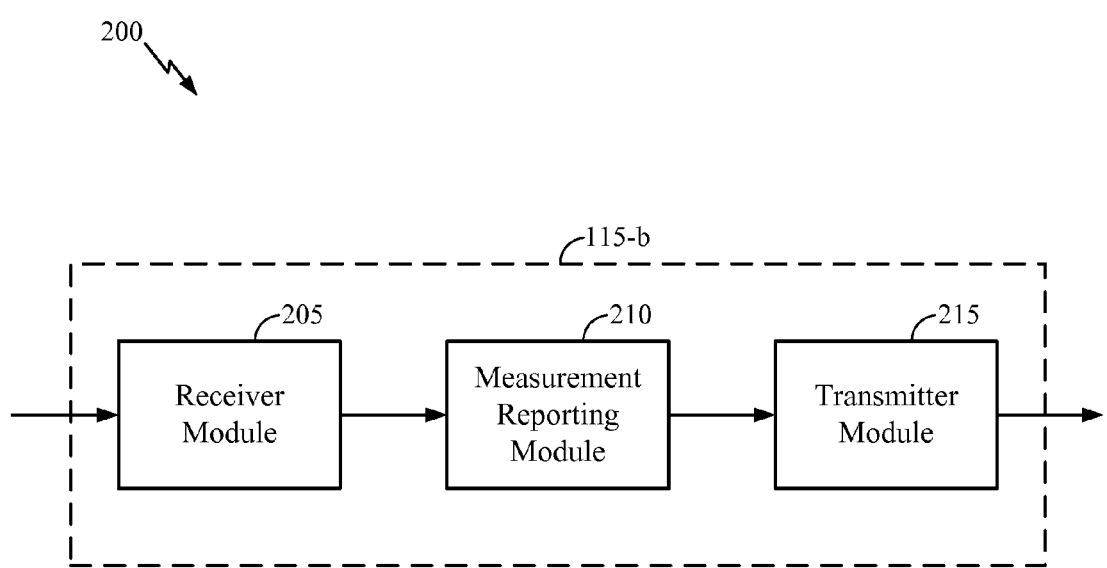
FIG. 2 shows a block diagram of a UE having a measurement reporting module, in accordance with aspects of the present disclosure.

Referring now to FIG. 2, a block diagram 200 illustrates a UE 115-b for transmitting a measurement report during wireless communications, in accordance with various aspects.

The UE 115-b may be an example of one or more aspects of one of the UEs 115 described with reference to FIG. 1. The UE 115-b may also be a processor. The UE 115-b may include a receiver module 205, a measurement reporting module 210, and/or a transmitter module 215. Each of these components may be in communication with each other.

The components of the UE 115-b may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other aspects, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 205 may include any number of receivers. In some cases the receiver module 505 may include a cellular receiver. The cellular receiver may in some cases be an LTE/LTE-A receiver. The cellular receiver may be used to receive various types of data and/or control signals, collectively referred to as transmissions. The transmissions may be received over one or more communication channels of a wireless communications system such as the wireless communications system 100 described with reference to FIG. 1. In some cases, the receiver module 205 may include an alternate or additional type of receiver, such as an Ethernet or WLAN receiver. The Ethernet or WLAN receiver may also be used to receive various types of data and/or control signals, and may also receive transmissions over one or more communication channels of a wireless communications system such as the wireless communications system 100.

The measurement reporting module 210 may perform various functions. In an LTE/LTE-A context, the measurement reporting module 210 may detect an entering condition or event for triggering a measurement report and start a time to trigger (TTT) timer. The entering condition or event may by, for example, a measured reference signal received power (RSRP) or a measured reference signal received quality (RSRQ) satisfying a threshold. The measurement reporting module 210 may then monitor the entering condition to ensure that it holds true for the duration of the TTT timer. Upon expiration of the TTT timer, the measurement reporting module 210 may trigger the preparation of a measurement report which has yet to be transmitted and trigger the sending of a service request to the network (e.g., to an eNB of the network) for an uplink (UL) grant. Upon the network allocating resources for transmission of the measurement report and providing the UL grant, the measurement reporting module 210 may transmit the measurement report to the network (e.g., to the eNB of the network).

When the UE 115-b is operating in a CDRX mode, it is possible that a TTT timer associated with a measurement report may expire during a CDRX OFF period. Transmission of the measurement report may therefore be delayed until a next CDRX ON period, or the measurement report may be discarded, or the UE 115-b may be waken from its CDRX OFF period for the purpose of transmitting the measurement report. Because all of these scenarios may be undesirable, the measurement reporting module 210 may in some cases transmit the measurement report early, such as before expiration of the TTT timer and before entering the CDRX OFF period. Such an early transmission may preserve the timeliness of the measurement report and/or enable the UE 115-b to conserve power by remaining in a sleep state during its CDRX OFF period.

Further, according to aspects, when the UE 115-b is operating in a CDRX mode, it is possible that a TTT timer associated with a measurement report may expire during a CDRX OFF period. In response, the UE may modify the low-power period according to the methods described herein.

The transmitter module 215 may include any number of transmitters. In some cases the transmitter module 215 may include a cellular transmitter. The cellular transmitter may in some cases be an LTE/LTE-A transmitter. The cellular transmitter may be used to transmit various types of data and/or control signals, collectively referred to as transmissions. The transmissions may be transmitted over one or more communication channels of a wireless communications system such as the wireless communications system 100 described with reference to FIG. 1. In some cases, the transmitter module 215 may include an alternate or additional type of transmitter, such as an Ethernet or WLAN transmitter. The Ethernet or WLAN transmitter may also be used to transmit various types of data and/or control signals, and may also transmit over one or more communication channels of a wireless communications system such as the wireless communications system 100.

Figure 3:
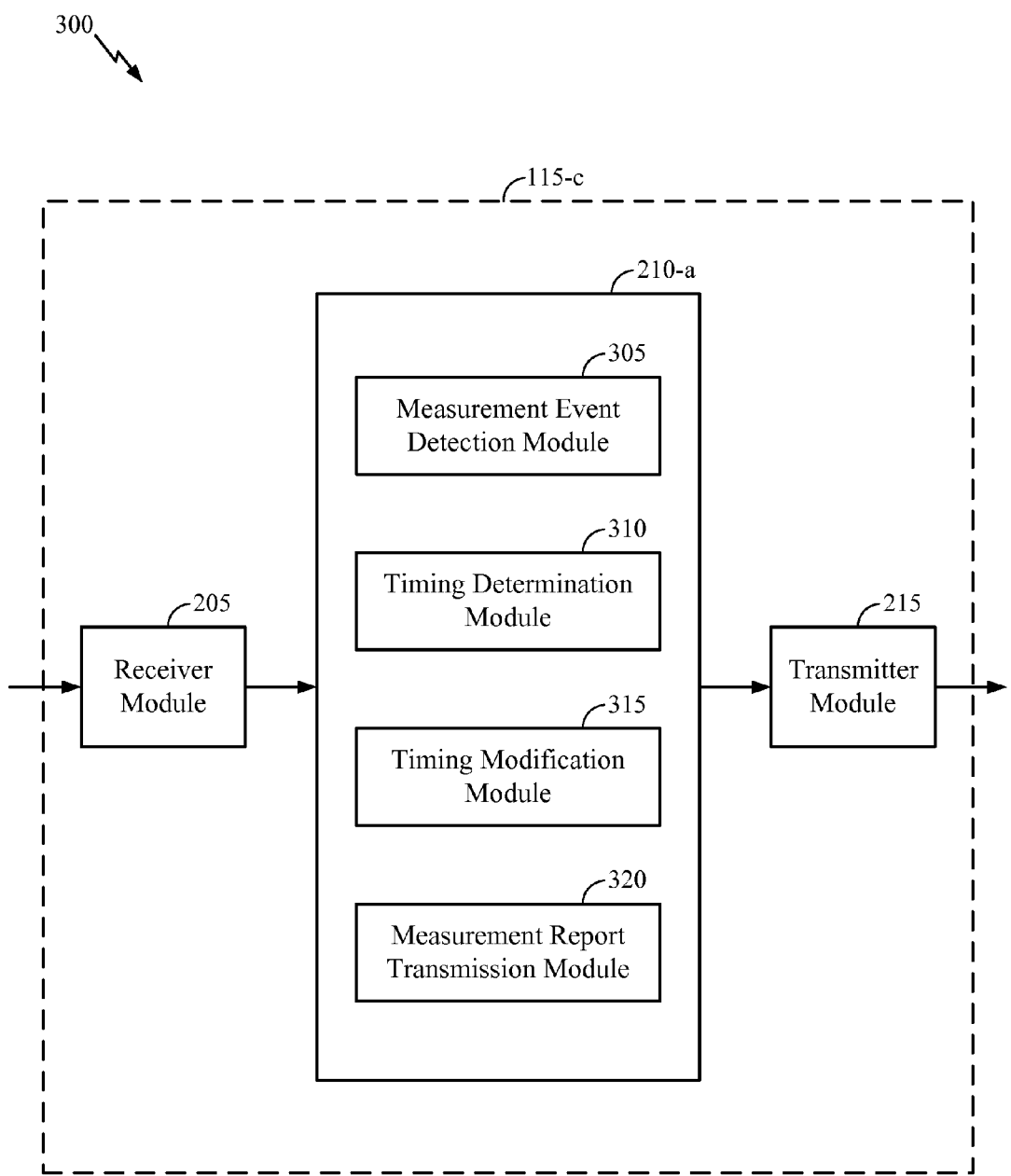
FIG. 3 shows a block diagram of another UE having a measurement reporting module, in accordance with aspects of the present disclosure.

FIG. 3 illustrates a UE 115-c with one or more components that may be configured to prioritize a measurement event timer over a low-power period as described herein. For example, the timing modification module may be configured to modify the low-power period in an effort to transmit the MR report upon expiry of a measurement event timer (e.g., TTT timer). The measurement report transmission module 320 may be configured to transmit the timely MR to the network.

Referring now to FIG. 3, a block diagram 300 illustrates a UE 115-c for transmitting a measurement report during wireless communications, in accordance with various aspects. The UE 115-c may be an example of one or more aspects of one of the UEs 115 described with reference to FIGS. 1 and/or 2. The UE 115-c may also be a processor. The UE 115-c may include a receiver module 205, a measurement reporting module 210-a, and/or a transmitter module 215. Each of these components may be in communication with each other.

The components of the UE 115-c may, individually or collectively, be implemented using one or more ASICs adapted to perform some or all of the applicable functions in hardware. Alternatively, the functions may be performed by one or more other processing units (or cores), on one or more integrated circuits. In other aspects, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The receiver module 205 and the transmitter module 215 may be configured similarly to what is described with reference to FIG. 2. The measurement reporting module 210-a may be an example of one or more aspects of the measurement reporting module 210 described with reference to FIG. 2 and may include a measurement event detection module 305, a timing determination module 310, a timing modification module 315, and/or a measurement report transmission module 320.

In some aspects, the measurement event detection module 305 may be used to detect a measurement event. The measurement event may in some cases be a mobility measurement event and/or an LTE/LTE-A measurement event, such as one of the measurement events described in 3GPP TS36.331, §5.5 (e.g., a measurement pertaining to the signal strength of a serving cell, the signal strength of a neighboring cell, and/or a comparison of the signal strength associated with a serving cell and the signal strength associated with a neighboring cell).

In some aspects, the timing determination module 310 may be used to determine whether a timing of a measurement report associated with a detected measurement event is during a CDRX OFF period. The CDRX OFF period may include a sleep period and/or a radio off period, such that the measurement report may not be transmitted during the CDRX OFF period.

In some aspects, the timing modification module 315 may be used to modify the timing of a measurement report in response to a determination by the timing determination module 310 that the timing of the measurement report is during a CDRX OFF period.

In some aspects, the measurement report transmission module 320 may be used to transmit a measurement report—at a normal time, at an early time, or at a delayed time.

Figure 4:
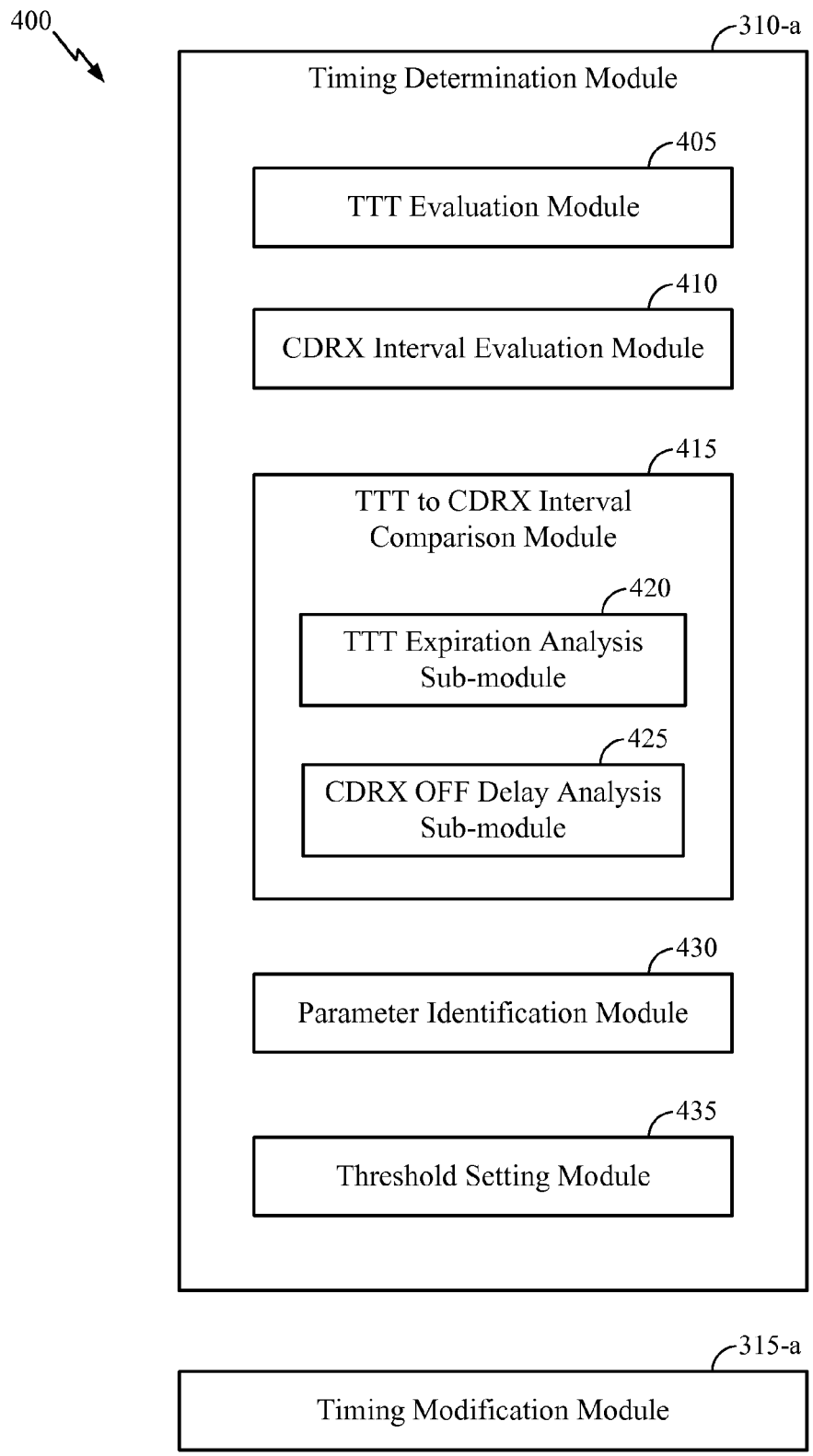
FIG. 4 is a block diagram of an example of a timing determination module and a timing modification module, in accordance with aspects of the present disclosure.

FIG. 4 illustrates example components of a UE that may be configured to prioritize a measurement event timer over a low-power period as described herein. For example, the TTT to CDRX interval comparison module 415 may be configured to modify the low-power period based on determining the low-power period begins during the TTT, a duration of the TT and a duration of the low-power period. Further, the TTT Expiration Analysis Sub-module 420 may be configured to determine if the timing of a measurement report associated with a measurement event is during a CDRX OFF period.

Referring now to FIG. 4, a block diagram 400 illustrates one aspect of a timing determination module 310-a and a timing modification module 315-a, in accordance with various aspects. The timing determination module 310-a and timing modification module 315-a may be examples of one or more aspects of the timing determination module 310 and timing modification module 315 described with reference to FIG. 3. The timing determination module 310-a may include a TTT evaluation module 405, a CDRX interval evaluation module 410, a TTT to CDRX interval comparison module 415, a parameter identification module 430, and/or a threshold setting module 435.

The components of the timing determination module 310-a and timing modification module 315-a may, individually or collectively, be implemented using one or more ASICs adapted to perform some or all of the applicable functions in hardware. Alternatively, the functions may be performed by one or more other processing units (or cores), on one or more integrated circuits. In other aspects, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some aspects, the TTT evaluation module 405 may be used to identify a TTT timer for a measurement report associated with a measurement event. The TTT evaluation module 405 may also identify a duration of the TTT timer. The identified duration of the TTT timer may in some cases be an elapsed duration of the TTT timer. The TTT evaluation module 405 may in some cases determine whether to modify the timing of a measurement report before a CDRX OFF period based, at least in part, on the identified duration of the TTT timer. For example, the TTT evaluation module 405 may compute a ratio of the elapsed duration of the TTT timer to the duration of the TTT timer, and then compare the ratio to a threshold (e.g., a threshold percentage, such as 50%) to determine whether the ratio satisfies the threshold (e.g., is greater than or equal to the threshold). In another example, the TTT evaluation module 405 may compare the elapsed duration of the TTT timer to a threshold (e.g., a threshold period of time, such as 80 ms) to determine whether the elapsed duration of the TTT timer satisfies the threshold (e.g., is greater than or equal to the threshold). In yet another example, the TTT evaluation module 405 may determine a maximum of 1) a particular percentage of the duration of the TTT timer (e.g., 50% of the TTT timer), and 2) a particular threshold period of time (e.g., 80 ms), and then compare the elapsed duration of the TTT timer to the maximum to determine whether the duration of the TTT timer is greater than or equal to the maximum. Upon determining that the elapsed duration of the TTT timer satisfies the threshold, the TTT evaluation module 405 may notify the timing modification module 315-a. The threshold applied by the TTT evaluation module 405 may be configured with recognition that the degree of measurement certainty (e.g., measurement stability) ensured by the TTT timer may in some cases need to be weighed against the value of measurement timeliness.

In some aspects, the CDRX interval evaluation module 410 may be used to identify a duration of a CDRX OFF period. The CDRX OFF period may include a sleep period and/or a radio off period, such that the measurement report may not be transmitted during the CDRX OFF period. The CDRX interval evaluation module 410 may in some cases determine whether to modify the timing of a measurement report before a CDRX OFF period based, at least in part, on the identified duration of the CDRX OFF period. For example, the CDRX interval evaluation module 410 may compare the duration of the CDRX OFF period to a threshold (e.g., a threshold period of time, such as 80 ms) to determine whether the duration of the CDRX OFF period is greater than or equal to the threshold. Upon determining that the duration of the CDRX OFF period satisfies the threshold, the CDRX interval evaluation module 410 may notify the timing modification module 315-a. The threshold applied by the CDRX interval evaluation module 410 may be configured with recognition that a CDRX OFF period of short enough duration may not impart a significant enough delay to render early transmission of a measurement report useful. Thus, when a CDRX OFF period is determined to be short enough (e.g., less than 80 ms in duration), the transmission of a measurement report may be delayed instead of accelerated.

In some aspects, the TTT to CDRX interval comparison module 415 (hereafter, the "comparison module") may include a TTT expiration analysis sub-module 420 and/or a CDRX OFF delay analysis sub-module 425. The TTT expiration analysis sub-module 420 may be used to determine whether the timing of a measurement report associated with a measurement event is during a CDRX OFF period. In some cases, the TTT expiration analysis sub-module 420 may determine whether the timing of a measurement report is during a CDRX OFF period by determining whether a TTT timer expires during the CDRX OFF period. Upon determining that the timing of a measurement report is during a CDRX OFF period, the TTT expiration analysis sub-module 420 may notify the timing modification module 315-a.

In some aspects, the CDRX OFF delay analysis sub-module 425 may be used to identify a duration between the timing of a measurement report (e.g., the expiration of a TTT timer) and a next CDRX ON period. The CDRX OFF delay analysis sub-module 425 may also determine whether to modify the timing of a measurement report before a CDRX OFF period based, at least in part, on the identified duration between the timing of the measurement report and the next CDRX ON period. For example, the CDRX OFF delay analysis sub-module 425 may compare the duration between the timing of a measurement report and a next CDRX ON period to a threshold (e.g., a threshold period of time) to determine whether the duration between the timing of the measurement report and the next CDRX ON period is greater than or equal to the threshold. Upon determining that the duration between the timing of a measurement report and a next CDRX period satisfies the threshold, the CDRX OFF delay analysis sub-module 425 may notify the timing modification module 315-a.

The parameter identification module 430 may be used to identify a parameter (e.g., a mobility parameter of the UE) such as the signal strength of a serving cell, the signal strength of a neighboring cell, or a comparison of the signal strength of a serving cell and the signal strength of a neighboring cell, may be identified. The identified parameter may then be used, by the threshold setting module 435, as a basis for selecting a threshold or thresholds for use by the TTT expiration analysis sub-module 420 and/or the CDRX OFF delay analysis sub-module 425. In some cases, the threshold may be selected based on the value of the identified parameter. In this manner, and by way of example, the threshold used by the TTT expiration analysis sub-module 420 and/or CDRX OFF delay analysis sub-module 425 may be 1) lowered as the timeliness of a measurement report increases with respect to the importance of a measurement being stable, and 2) raised as the stability of a measurement increases with respect to the importance of measurement report timeliness. The timeliness of a measurement report may be deemed to increase when, for example, the value of a mobility parameter is outside (or sufficiently outside) an acceptable range or the value of the mobility parameter has changed significantly.

In some aspects, the timing modification module 315-a may receive the notifications provided by the TTT evaluation module 405, the CDRX interval evaluation module 410, and/or the TTT to CDRX interval comparison module 415 and determine whether to modify the timing of a measurement report before a CDRX OFF period. In some cases, the timing modification module 315-a may make the modification upon receiving affirmative notifications from each of the TTT evaluation module 405, the CDRX interval evaluation module 410, and the TTT to CDRX interval comparison module 415. In other cases, the timing modification module 315-a may make the modification upon receiving affirmative notifications from fewer than all of the modules 405, 410, and 415.

By modifying the timing of a measurement report to transmit the measurement report early, such as before expiration of the TTT timer and before entering the CDRX OFF period, the measurement report may be transmitted in a more timely manner than if its transmission were delayed until a next CDRX ON period. The timeliness of a measurement report may be of particular concern for certain kinds of measurement reports, such as mobility measurement reports. For example, in a high mobility scenario, the signal levels of a UE's serving cell and neighboring cells may change rapidly. When a UE is moving away from its serving cell and toward a neighboring cell at a high speed, the serving cell RSRP for the UE may drop quickly and the neighboring cell RSRP for the UE may rise quickly. In such a case, the early transmission of a measurement report, from the UE to an eNB of its serving cell, may enable the timely transmission of a handover command to the UE. On the other hand, transmission of the measurement report one CDRX cycle late may result in a scenario in which the RSRP of the serving cycle has dropped so significantly that the UE can no longer communicate with the eNB of its serving cell, ultimately leading to radio link failure (RLF) for the UE.

Figure 5:
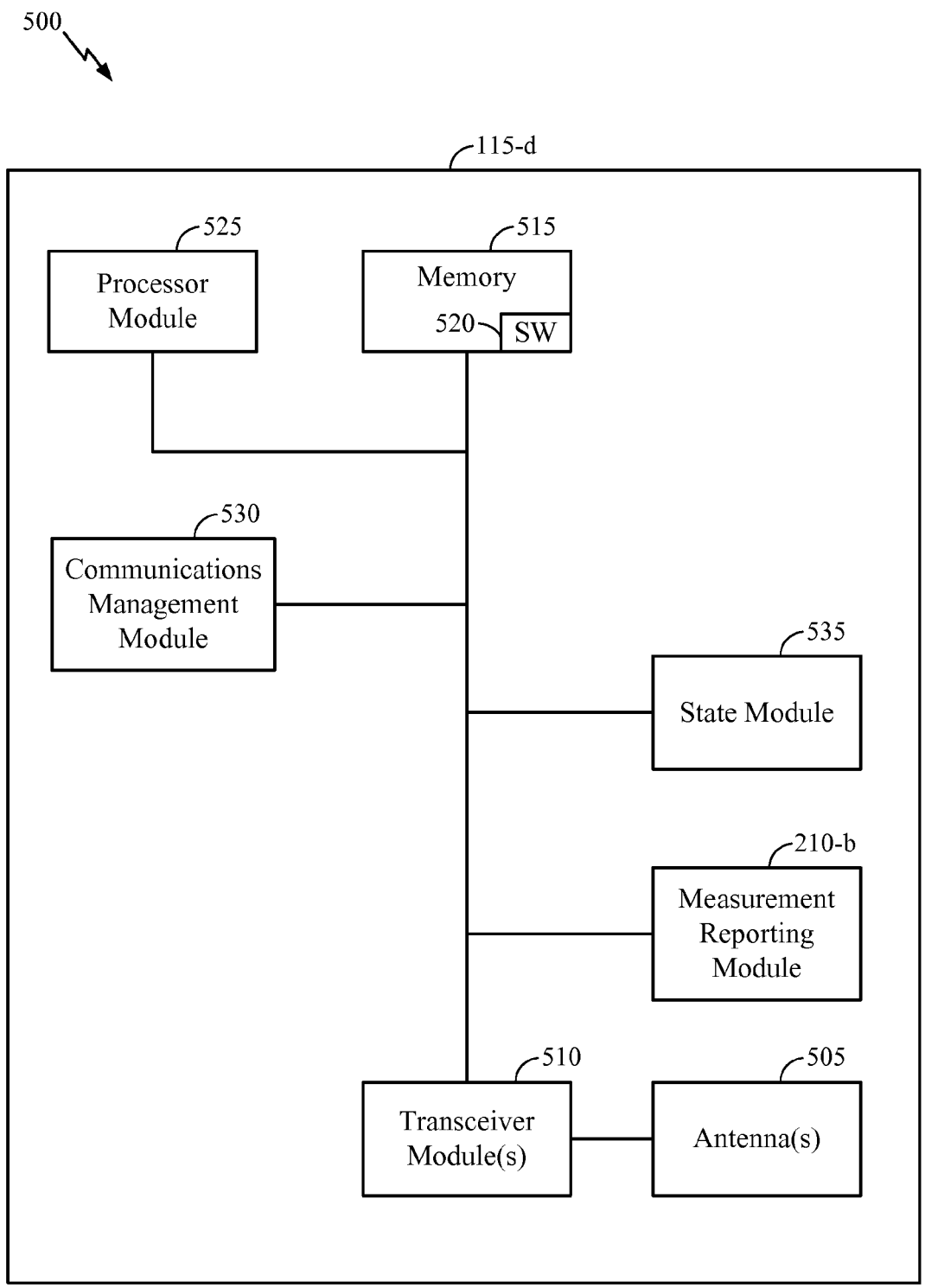
FIG. 5 is a block diagram of an example of a UE, in accordance with aspects of the present disclosure.

FIG. 5 illustrates example components of a UE 115-d configured to perform aspects described herein. For example, the processor module 525 may be coupled to a memory 515. The memory may store instructions for prioritizing a measurement event timer over a low-power period.

FIG. 5 is an example of a block diagram 500 of a UE 115-d. The UE 115-d may be an example of one or more aspects of the UEs 115 described with reference to FIGS. 1, 2, and/or 3. The UE 115-d may have any of various configurations and may be, or be included as part of, a personal computer (e.g., laptop computer, netbook computer, tablet computer, etc.), a cellular telephone, a PDA, a digital video recorders (DVR), an internet appliance, a gaming console, an e-reader, etc. The UE 115-d may have an internal power supply (not shown), such as a small battery, to facilitate mobile operation.

The UE 115-d may include antenna(s) 505, transceiver module(s) 510, memory 515, and a processor module 525. Each of these components may be in communication, directly or indirectly, with each other (e.g., via one or more buses 540). The transceiver module(s) 510 may be configured to communicate bi-directionally, via the antenna(s) 505 and/or one or more wired or wireless links, with one or more networks. For example, the transceiver module(s) 510 may be configured to communicate bi-directionally with one or more of the access points 105 (e.g., eNBs or WLAN access points) described with reference to FIG. 1. The transceiver module(s) 510 may also be configured to communicate directly with one or more other UEs 115 (e.g., via device to device communications). The transceiver module(s) 510 may include a modem configured to modulate packets and provide modulated packets to the antenna(s) 505 for transmission, and to demodulate packets received from the antenna(s) 505. While the UE 115-d may include a single antenna, the UE 115-d may typically include multiple antennas for multiple links.

The memory 515 may include random access memory (RAM) and/or read-only memory (ROM). The memory 515 may store computer-readable, computer-executable software (SW) code 520 containing instructions that are configured to, when executed, cause the processor module 525 to perform various functions, including one or more of the functions described herein for transmitting a measurement report during wireless communications. Alternatively, the software code 520 may not be directly executable by the processor module 525 but may be configured to cause the UE 115-d (e.g., when compiled and executed) to perform one or more of the functions described herein.

The processor module 525 may include an intelligent hardware device, e.g., a CPU, a microcontroller, an ASIC, etc. The processor module 525 may process information received via the antenna(s) 505 and the transceiver module(s) 510, and/or may send information to be transmitted via the transceiver module(s) 510 and the antenna(s) 505. The processor module 525 may handle, alone or in connection with a measurement reporting module 210-b, various aspects of transmitting a measurement report during wireless communications, as described herein.

According to the architecture of FIG. 5, the UE 115-d may further include a communications management module 530 and a state module 535. The communications management module 530 may establish and manage communications with access points 105 and/or other UEs 115.

The state module 535 may reflect and control the current device state (e.g., context, authentication, base station association, and/or other connectivity issues).

The measurement reporting module 210-b may manage various aspects of the measurement report transmissions described herein, and in some cases may be an example of aspects of the measurement reporting module 210 described with reference to FIGS. 2, 3, and/or 4.

By way of example, each of the communications management module 530, the state module 535, and/or the measurement reporting module 210-b may be a component of the UE 115-d in communication with some or all of the other components of the UE 115-d via one or more buses. Alternatively, functionality of the communications management module 530, the state module 535, and/or the measurement reporting module 210-b may be implemented as components of the transceiver module(s) 510, as a computer program product, and/or as one or more controller elements of the processor module 525.

The components of the UE 115-d may, individually or collectively, be implemented with one or more ASICs adapted to perform some or all of the applicable functions in hardware. Alternatively, the functions may be performed by one or more other processing units (or cores), on one or more integrated circuits. In other aspects, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the UE 115-d.

Early Transmission of MRs

Figure 6:
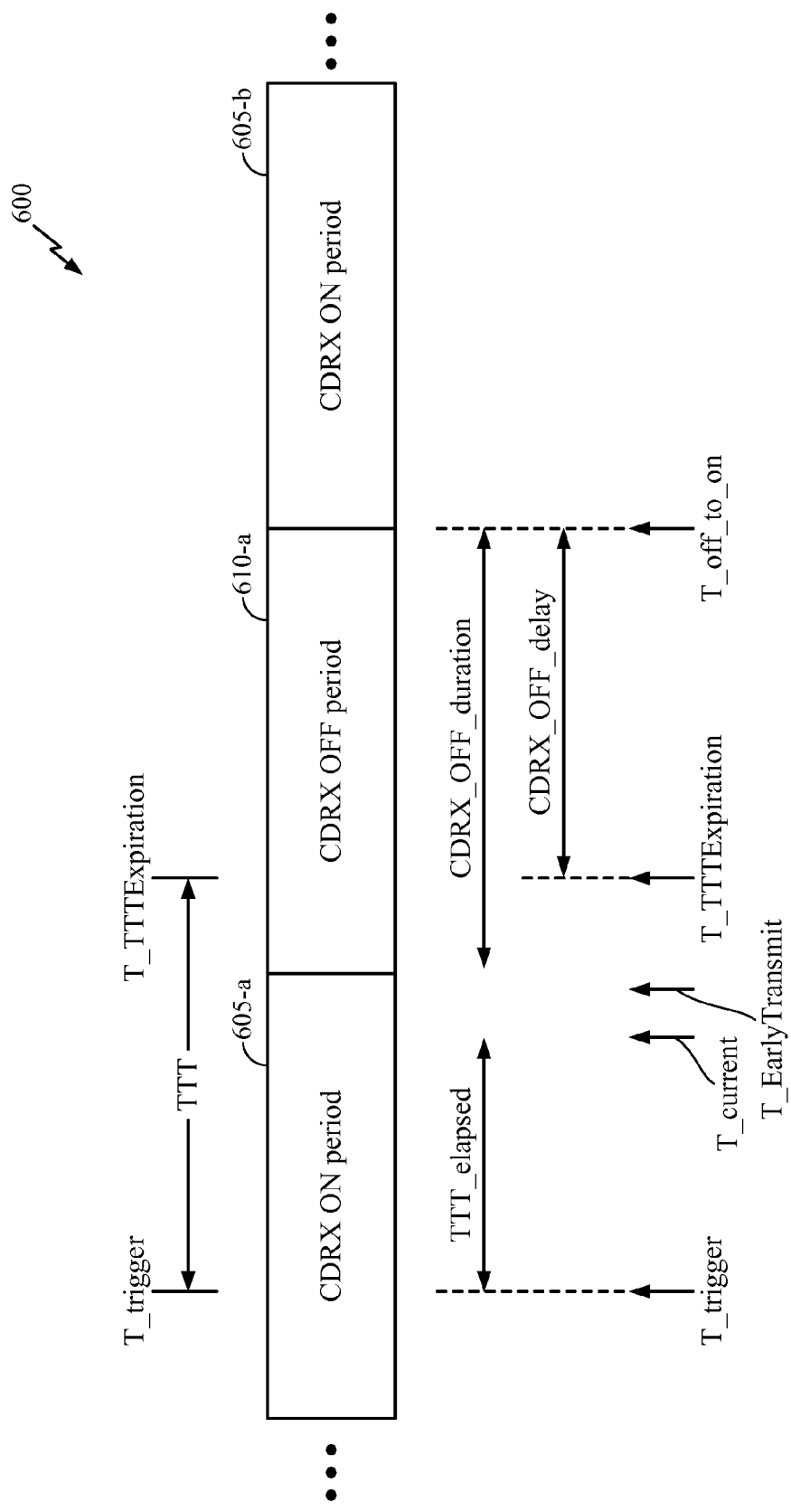
FIG. 6 is a timing diagram illustrating the transmission of measurement reports under different conditions, in accordance with aspects of the present disclosure.

FIG. 6 is a timing diagram 600 illustrating an example transmission of a measurement report during wireless communications. In one aspect, the measurement report may be transmitted by one of the UEs 115 described with reference to the accompanying figures.

When operating in a CDRX mode, a UE 115 may cycle through an alternating sequence of CDRX ON periods 605 and CDRX OFF periods 610. At a time T_trigger during a CDRX ON period 605-a, the UE 115 may detect a measurement event. The measurement event may in some cases be an entering condition or event for triggering a measurement report. Upon the occurrence of the measurement event, the UE 115 may start a TTT timer. The TTT timer may have a duration of TTT ending at T_TTTExpiration.

At a time T_current, typically close to when the UE 115 is about to enter a CDRX OFF period 610-a, the UE 115 may determine that the timing of a measurement report (MR) associated with the measurement event is during the CDRX OFF period 610-a (e.g., because T_TTTExpiration occurs during the CDRX OFF period 610-a).

Upon determining that the timing of the measurement report is during the CDRX OFF period 610-a, the UE 115 may assess other factors to determine whether the measurement report should be transmitted before expiration of the TTT timer and before entering the CDRX OFF period 610-a. One of the factors that may be assessed is the elapsed duration of the TTT timer (i.e., TTT_elapsed). TTT_elapsed may be computed as TTT_elapsed=T_current−T_trigger. In some cases, a ratio of TTT_elapsed/TTT may be compared to a threshold percentage, such as 50%, to determine whether the threshold percentage is satisfied. In other cases, TTT_elapsed may be compared to a threshold period of time, such as 80 ms, to determine whether the threshold period of time is satisfied. In other cases, a maximum of 1) a particular percentage of the duration of the TTT timer (e.g., 50% of the TTT timer), and 2) a particular threshold period of time (e.g., 80 ms), may be determined TTT_elapsed may then be compared to the maximum to determine whether the maximum is satisfied. Satisfaction of the threshold may increase the likelihood that a measurement report transmitted before the expiration of its TTT timer will contain a useful measurement (e.g., a measurement that has been maintained for a period of time, albeit less than the duration of the TTT timer). In the example shown in FIG. 6, this threshold is satisfied.

Another factor that may be assessed before determining whether the measurement report should be transmitted before expiration of the TTT timer and before entering the CDRX OFF period 610-a is the duration (i.e., CDRX_OFF_duration) of the CDRX OFF period 610-a. When the duration of the CDRX OFF period 610-a is short enough that it will not substantially delay the transmission of the measurement report, early transmission of the measurement report may be avoided. In some cases, it may be determined whether the duration of the CDRX OFF period 610-a satisfies a threshold period of time, such as 80 ms. In the example shown in FIG. 6, this threshold is satisfied.

Yet another factor that may be assessed before determining whether the measurement report should be transmitted before expiration of the TTT timer and before entering the CDRX OFF period 610-a is the duration between the timing of the measurement report (e.g., T_TTTExpiration) and a next CDRX ON period 605-b (e.g., T_off_to_on). When the period of time between T_TTTExpiration and T_off_to_on is short enough that it will not substantially delay the transmission of the measurement report, early transmission of the measurement report may be avoided. In some cases, the period of time between T_TTTExpiration and T_off_to_on or the CDRX_OFF_duration may be assessed (i.e., one or the other factor may be assessed).

When the timing of the measurement report is determined to be during the CDRX OFF period 610-a, and all other assessment thresholds are satisfied, the measurement report may be transmitted early at a time T_EarlyTransmit, before entering the CDRX OFF period 610-a. The early transmission of the measurement report may improve its timeliness.

Figure 7:
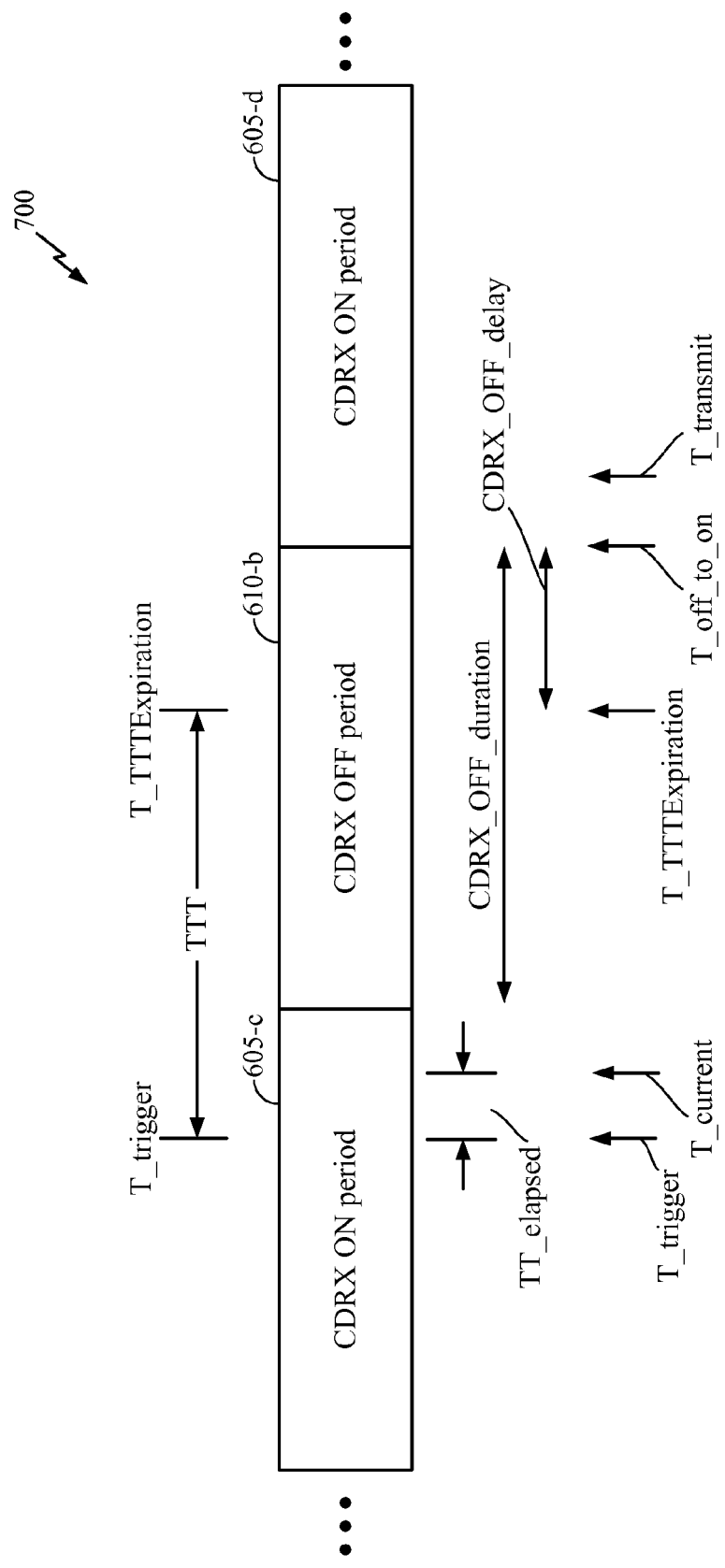
FIG. 7 is a timing diagram illustrating the transmission of measurement reports under different conditions, in accordance with aspects of the present disclosure.

FIG. 7 is a timing diagram 700 illustrating an example transmission of a MR during wireless communications. In one aspect, the MR may be transmitted by one of the UEs 115 described with reference with reference to the accompanying figures.

When operating in a CDRX mode, a UE 115 may cycle through an alternating sequence of CDRX ON periods 605 and CDRX OFF periods 610. At a time T_trigger during a CDRX ON period 605-c, the UE 115 may detect a measurement event. The measurement event may in some cases be an entering condition or event for triggering a measurement report. Upon the occurrence of the measurement event, the UE 115 may start a TTT timer. The TTT timer may have a duration of TTT ending at T_TTTExpiration.

At a time T_current, typically close to when the UE 115 is about to enter a CDRX OFF period 610-b, the UE 115 may determine that the timing of a measurement report associated with the measurement event is during the CDRX OFF period 610-b (e.g., because T_TTTExpiration occurs during the CDRX OFF period 610-b).

Upon determining that the timing of the measurement report is during the CDRX OFF period 610-b, the UE 115 may assess other factors to determine whether the measurement report should be transmitted before expiration of the TTT timer and before entering the CDRX OFF period 610-b. One of the factors that may be assessed is the elapsed duration of the TTT timer (i.e., TTT_elapsed). TTT_elapsed may be computed as TTT_elapsed=T_current−T_trigger. In some cases, a ratio of TTT_elapsed/TTT may be compared to a threshold percentage, such as 50%, to determine whether the threshold percentage is satisfied. In other cases, TTT_elapsed may be compared to a threshold period of time, such as 80 ms, to determine whether the threshold period of time is satisfied. In other cases, a maximum of 1) a particular percentage of the duration of the TTT timer (e.g., 50% of the TTT timer), and 2) a particular threshold period of time (e.g., 80 ms), may be determined TTT_elapsed may then be compared to the maximum to determine whether the maximum is satisfied.

Satisfaction of the threshold may increase the likelihood that a measurement report transmitted before the expiration of its TTT timer will contain a useful measurement (e.g., a measurement that has been maintained for a period of time, albeit less than the duration of the TTT timer). In the example shown in FIG. 7, this threshold is not satisfied.

Another factor that may be assessed before determining whether the measurement report should be transmitted early is the duration (i.e., CDRX_OFF_duration) of the CDRX OFF period 610-b. When the duration of the CDRX OFF period 610-b is short enough that it will not substantially delay the transmission of the measurement report, early transmission of the measurement report may be avoided. In some cases, it may be determined whether the duration of the CDRX OFF period 610-b satisfies a threshold period of time, such as 80 ms. In the example shown in FIG. 7, this threshold is satisfied.

Yet another factor that may be assessed before determining whether the measurement report should be transmitted early is the duration between the timing of the measurement report (e.g., T_TTTExpiration) and a next CDRX ON period 605-d (e.g., T_off_to_on). When the period of time between T_TTTExpiration and T_off_to_on is short enough that it will not substantially delay the transmission of the measurement report, early transmission of the measurement report may be avoided. In some cases, the period of time between T_TTTExpiration and T_off_to_on or the CDRX_OFF_duration may be assessed (i.e., one or the other factor may be assessed).

When the timing of the measurement report is determined to be during the CDRX OFF period 610-b, but all other assessment thresholds are not satisfied, the measurement report may be transmitted following the CDRX OFF period 610-b, at a time T_Transmit.

Figure 8:
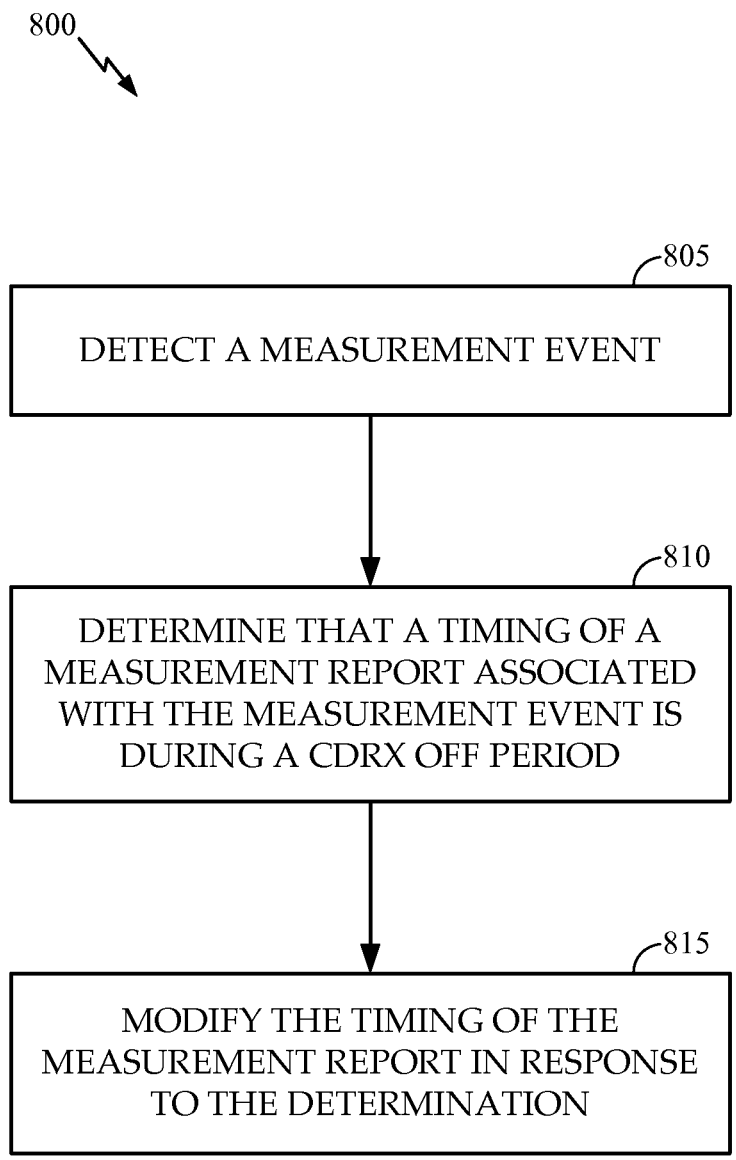
FIG. 8 illustrates example operations performed by a UE, in accordance with aspects of the present disclosure.

FIG. 8 illustrates an example of a method 800 for transmitting a measurement report during wireless communications, according to aspects of the present disclosure. For clarity, the method 800 is described below with reference to one of the UEs 115 described with reference to the accompanying figures. In one aspect, a UE 115 may execute one or more sets of codes to control the functional elements of the UE 115 to perform the functions described below.

At block 805, a measurement event is detected. The measurement event may in some cases be a mobility measurement event and/or an LTE/LTE-A measurement event, such as one of the measurement events described in 3GPP TS36.331, §5.5 (e.g., a measurement pertaining to the signal strength of a serving cell, the signal strength of a neighboring cell, and/or a comparison of the signal strength associated with a serving cell and the signal strength associated with a neighboring cell). The operations at block 805 may in some cases be performed using the measurement reporting module 210 and/or the measurement event detection module 305.

At block 810, it may be determined that a timing of a measurement report associated with the measurement event is during a CDRX OFF period. The CDRX OFF period may include a sleep period and/or a radio off period, such that the measurement report may not be transmitted during the CDRX OFF period. The operations at block 810 may in some cases be performed using the measurement reporting module 210 and/or the timing determination module 310.

At block 815, the timing of the measurement report may be modified in response to the determination made at block 810. The operations at block 815 may in some cases be performed using the measurement reporting module 210 and/or the timing modification module 315.

Thus, the method 800 may provide for transmitting a measurement report during wireless communications. It should be noted that the method 800 is just one implementation and that the operations of the method 800 may be rearranged or otherwise modified such that other implementations are possible.

Figure 9:
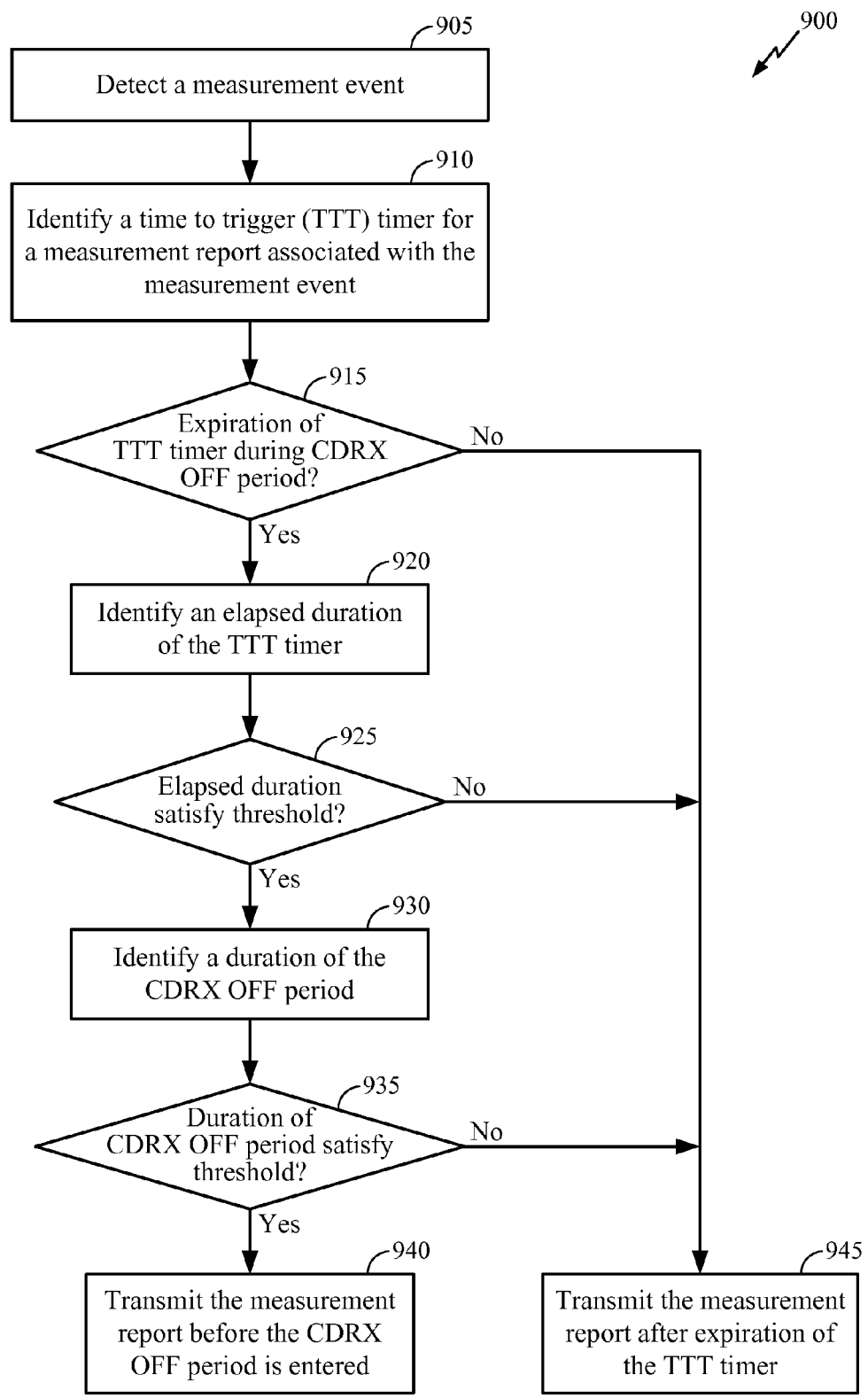
FIG. 9 illustrates an example flow diagram for transmitting measurement reports, in accordance with aspects of the present disclosure.

FIG. 9 is a flow chart illustrating an example of a method 900 for transmitting a measurement report during wireless communications. In one aspect, a UE 115 may execute one or more sets of codes to control the functional elements of the UE 115 to perform the functions described below.

At block 905, a measurement event is detected. The measurement event may in some cases be a mobility measurement event and/or an LTE/LTE-A measurement event, such as one of the measurement events described in 3GPP TS36.331, §5.5 (e.g., a measurement pertaining to the signal strength of a serving cell, the signal strength of a neighboring cell, and/or a comparison of the signal strength associated with a serving cell and the signal strength associated with a neighboring cell). The operations at block 905 may in some cases be performed using the measurement reporting module 210 and/or the measurement event detection module 305.

At block 910, a TTT timer for a measurement report associated with the measurement event may be identified. The operations at block 910 may in some cases be performed using the measurement reporting module 210, the timing determination module 310, and/or the TTT evaluation module 405.

At block 915, it may be determined whether a timing of a measurement report associated with the measurement event is during a CDRX OFF period. In some cases, the determination may be made by determining whether the TTT timer identified at block 910 expires during the CDRX OFF period. The CDRX OFF period may include a sleep period and/or a radio off period, such that the measurement report may not be transmitted during the CDRX OFF period. The operations at block 915 may in some cases be performed using the measurement reporting module 210, the timing determination module 310, and/or the TTT expiration analysis sub-module 420.

When it is determined at block 915 that the timing of the measurement report is not during the CDRX OFF period, or that the TTT timer does not expire during the CDRX OFF period, processing may proceed to block 945, where the measurement report may be transmitted after expiration of the TTT timer (e.g., during a next CDRX ON period or during a CDRX ON period following the CDRX OFF period). The operations at block 945 may be performed using the measurement reporting module 210 and/or the measurement report transmission module 320.

When it is determined at block 915 that the timing of the measurement report is during the CDRX OFF period, or that the TTT timer expires during the CDRX OFF period, the method 900 may continue at block 920. At block 920, a duration of the TTT timer may be identified. In some aspects, the identified duration of the TTT timer may be an elapsed duration of the TTT timer. The operations at block 920 may be performed using the measurement reporting module 210, the timing determination module 310, and/or the TTT evaluation module 405.

At block 925, it may determined whether to modify the timing of the measurement report before entering the CDRX OFF period based, at least in part, on the identified duration of the TTT timer. In some cases, the determination may include computing a ratio of the elapsed duration of the TTT timer to the duration of the TTT timer, and then comparing the ratio to a threshold (e.g., a threshold percentage, such as 50%) to determine whether the ratio satisfies the threshold (e.g., is greater than or equal to the threshold). In other cases, the determination may include comparing the elapsed duration of the TTT timer to a threshold (e.g., a threshold period of time, such as 80 ms) to determine whether the elapsed duration of the TTT timer satisfies the threshold (e.g., is greater than or equal to the threshold). In other cases, the determination may include determining a maximum of 1) a particular percentage of the duration of the TTT timer (e.g., 50% of the TTT timer), and 2) a particular threshold period of time (e.g., 80 ms), and then comparing the elapsed duration of the TTT timer to the maximum to determine whether the duration of the TTT timer is greater than or equal to the maximum. The operations at block 925 may be performed using the measurement reporting module 210, the timing determination module 310, and/or the TTT evaluation module 405.

When it is determined at block 925 that the elapsed duration of the TTT timer does not satisfy the threshold, processing may proceed once again to block 945, where the measurement report may be transmitted after expiration of the TTT timer (e.g., during a next CDRX ON period or during a CDRX ON period following the CDRX OFF period).

When it is determined at block 925 that the elapsed duration of the TTT timer does satisfy the threshold, the method 900 may continue at block 930. At block 930, a duration of the CDRX OFF period may be identified. The operations at block 930 may be performed using the measurement reporting module, the timing determination module 310, and/or the CDRX interval evaluation module 410.

At block 935, it may determined whether to modify the timing of the measurement report before entering the CDRX OFF period based, at least in part, on the identified duration of the CDRX OFF period. In some cases, the determination may include comparing the duration of the CDRX OFF period to a threshold (e.g., a threshold period of time, such as 80 ms) to determine whether the duration of the CDRX OFF period is greater than or equal to the threshold. The operations at block 935 may be performed using the measurement reporting module 210, the timing determination module 310, and/or the CDRX interval evaluation module 410.

When it is determined at block 935 that the CDRX duration does not satisfy the threshold, processing may proceed once again to block 945, where the measurement report may be transmitted after expiration of the TTT timer (e.g., during a next CDRX ON period or during a CDRX ON period following the CDRX OFF period).

When it is determined at block 935 that the CDRX duration does satisfy the threshold, the method 900 may continue at block 940. At block 940, the timing of the measurement report may be modified in response to the determinations made at blocks 915, 925, and 935. The modification of the timing may include transmitting the measurement report before the CDRX OFF period is entered. The operations at block 940 may in some cases be performed using the measurement reporting module 210, the timing modification module 315, and/or the measurement report transmission module 320.

By transmitting the measurement report early, such as before expiration of the TTT timer and before entering the CDRX OFF period, the measurement report may be transmitted in a more timely manner than if its transmission were delayed until a next CDRX ON period. The timeliness of a measurement report may be of particular concern for certain kinds of measurement reports, such as mobility measurement reports.

In alternate aspects of the method 900, the transmission of the measurement report at block 940 may be made in response to one or none of the determinations made at blocks 925 and 935, or in response to alternate and/or additional determinations. However, an affirmative determination at block 925 may increase the likelihood that the measurement report transmitted at block 940 will contain a useful measurement (e.g., a measurement that has been maintained for a period of time, albeit less than the duration of the TTT timer). An affirmative determination at block 935 may avoid the early transmission of a measurement report when the duration of the CDRX OFF period is short enough that it will not substantially delay the transmission of the measurement report.

In some aspects of the method 900, a parameter (e.g., a mobility parameter) such as the signal strength of a serving cell, the signal strength of a neighboring cell, or a comparison of the signal strength of a serving cell and the signal strength of a neighboring cell, may be identified. The identified parameter may then be used as a basis for selecting the threshold used at block 925. For example, the threshold may be selected based on the value of the identified parameter. In this manner, and by way of example, the threshold used at block 925 may be 1) lowered as the timeliness of a measurement report increases with respect to the importance of a measurement being stable, and 2) raised as the stability of a measurement increases with respect to the importance of measurement report timeliness. The timeliness of a measurement report may be deemed to increase when, for example, the value of a mobility parameter is outside (or sufficiently outside) an acceptable range or the value of the mobility parameter has changed significantly.

Thus, the method 900 may provide for transmitting a measurement report during wireless communications. It should be noted that the method 900 is just one implementation and that the operations of the method 900 may be rearranged or otherwise modified such that other implementations are possible.

Figure 10:
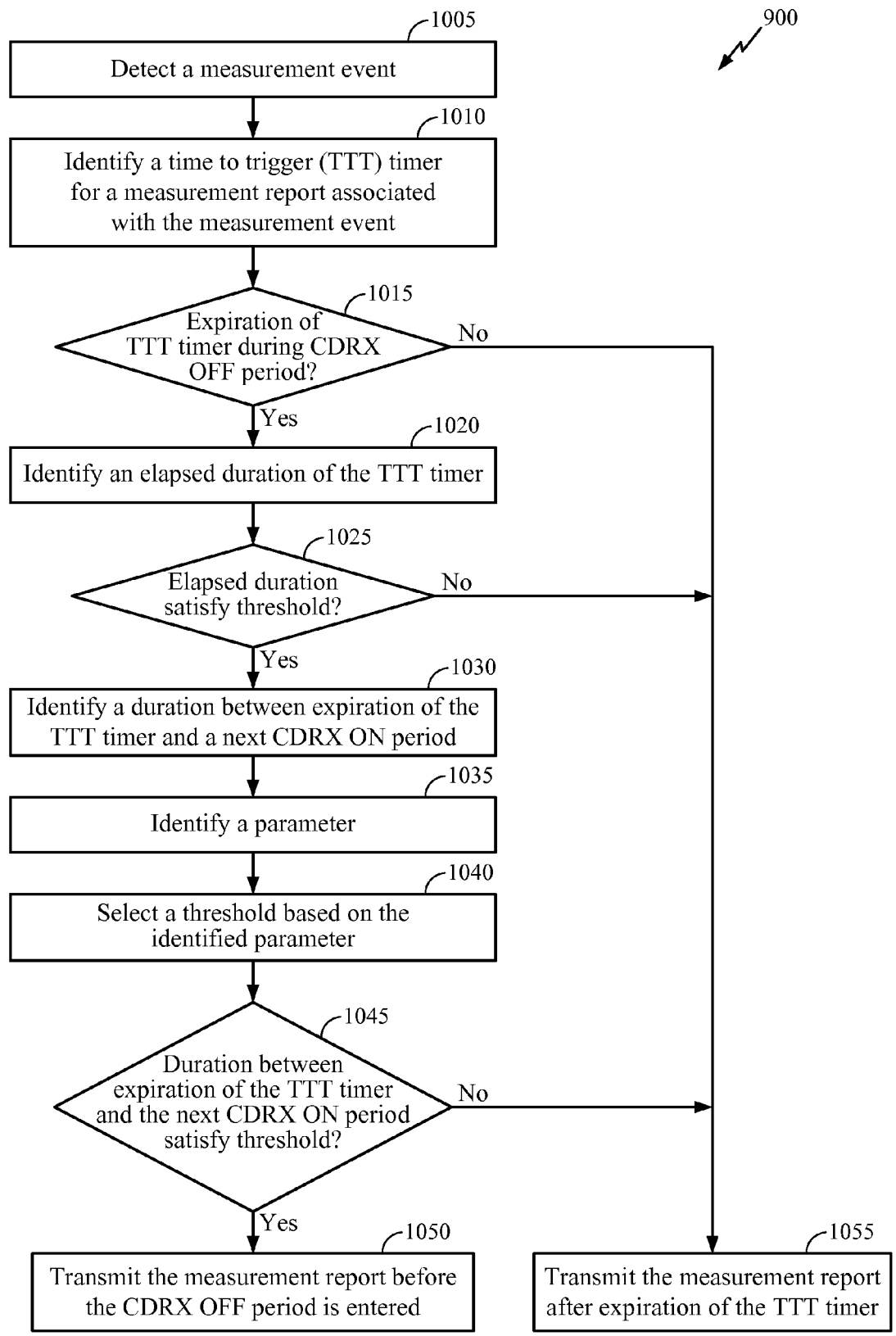
FIG. 10 illustrates an example flow diagram for transmitting measurement reports, in accordance with aspects of the present disclosure.

FIG. 10 is a flow chart illustrating an example of a method 1000 for transmitting a measurement report during wireless communications. For clarity, the method 1000 is described below with reference to one of the UEs 115 illustrated in the accompanying figures. In one aspect, a UE 115 may execute one or more sets of codes to control the functional elements of the UE 115 to perform the functions described below.

At block 1005, a measurement event is detected. The measurement event may in some cases be a mobility measurement event and/or an LTE/LTE-A measurement event, such as one of the measurement events described in 3GPP TS36.331, §5.5 (e.g., a measurement pertaining to the signal strength of a serving cell, the signal strength of a neighboring cell, and/or a comparison of the signal strength associated with a serving cell and the signal strength associated with a neighboring cell). The operations at block 1005 may in some cases be performed using the measurement reporting module 210 and/or the measurement event detection module 305.

At block 1010, a TTT timer for a measurement report associated with the measurement event may be identified. The operations at block 1010 may in some cases be performed using the measurement reporting module 210, the timing determination module 310, and/or the TTT evaluation module 405.

At block 1015, it may be determined whether a timing of a measurement report associated with the measurement event is during a CDRX OFF period. In some cases, the determination may be made by determining whether the TTT timer identified at block 1010 expires during the CDRX OFF period. The CDRX OFF period may include a sleep period and/or a radio off period, such that the measurement report may not be transmitted during the CDRX OFF period. The operations at block 1015 may in some cases be performed using the measurement reporting module 210, the timing determination module 310, and/or the TTT expiration analysis sub-module 420.

When it is determined at block 1015 that the timing of the measurement report is not during the CDRX OFF period, or that the TTT timer does not expire during the CDRX OFF period, processing may proceed to block 1055, where the measurement report may be transmitted after expiration of the TTT timer (e.g., during a next CDRX ON period or during a CDRX ON period following the CDRX OFF period). The operations at block 1055 may be performed using the measurement reporting module 210 and/or the measurement report transmission module 320.

When it is determined at block 1015 that the timing of the measurement report is during the CDRX OFF period, or that the TTT timer expires during the CDRX OFF period, the method 1000 may continue at block 1020. At block 1020, a duration of the TTT timer may be identified. In some aspects, the identified duration of the TTT timer may be an elapsed duration of the TTT timer. The operations at block 1020 may be performed using the measurement reporting module 210, the timing determination module, and/or the TTT evaluation module 405.

At block 1025, it may determined whether to modify the timing of the measurement report before entering the CDRX OFF period based, at least in part, on the identified duration of the TTT timer. In some cases, the determination may include computing a ratio of the elapsed duration of the TTT timer to the duration of the TTT timer, and then comparing the ratio to a threshold (e.g., a threshold percentage, such as 50%) to determine whether the ratio satisfies the threshold (e.g., is greater than or equal to the threshold). In other cases, the determination may include comparing the elapsed duration of the TTT timer to a threshold (e.g., a threshold period of time, such as 80 ms) to determine whether the elapsed duration of the TTT timer satisfies the threshold (e.g., is greater than or equal to the threshold). In other cases, the determination may include determining a maximum of 1) a particular percentage of the duration of the TTT timer (e.g., 50% of the TTT timer), and 2) a particular threshold period of time (e.g., 80 ms), and then comparing the elapsed duration of the TTT timer to the maximum to determine whether the duration of the TTT timer is greater than or equal to the maximum. The operations at block 1025 may be performed using the measurement reporting module 210, the timing determination module 310, and/or the TTT evaluation module 405.

When it is determined at block 1025 that the elapsed duration of the TTT timer does not satisfy the threshold, processing may proceed once again to block 1055, where the measurement report may be transmitted after expiration of the TTT timer (e.g., during a next CDRX ON period or during a CDRX ON period following the CDRX OFF period).

When it is determined at block 1025 that the elapsed duration of the TTT timer does satisfy the threshold, the method 1000 may continue at block 1030. At block 1030, a duration between the timing of the measurement report (e.g., expiration of the TTT timer) and a next CDRX ON period may be identified. The operations at block 1030 may be performed using the measurement reporting module 210, the timing determination module 310, and/or the CDRX OFF delay analysis sub-module 425.

At block 1035, a parameter (e.g., a mobility parameter) such as the signal strength of a serving cell, the signal strength of a neighboring cell, or a comparison of the signal strength of a serving cell and the signal strength of a neighboring cell, may be identified. The identified parameter may then be used, at block 1040, as a basis for selecting a threshold to be used at block 1045. In some cases, the threshold may be selected based on the value of the identified parameter. In this manner, and by way of example, the threshold used at block 1045 may be 1) lowered as the timeliness of a measurement report increases with respect to the importance of a measurement being stable, and 2) raised as the stability of a measurement increases with respect to the importance of measurement report timeliness. The timeliness of a measurement report may be deemed to increase when, for example, the value of a mobility parameter is outside (or sufficiently outside) an acceptable range or the value of the mobility parameter has changed significantly.

The operations at block 1035 may be performed using the measurement reporting module 210, the timing determination module 310, and/or the parameter identification module 430. The operations at block 1040 may be performed using the measurement reporting module 210, the timing determination module 310, and/or the threshold setting module 435.

At block 1045, it may determined whether to modify the timing of the measurement report before entering the CDRX OFF period based, at least in part, on the identified duration between the timing of the measurement report (e.g., expiration of the TTT timer) and the next CDRX ON period. In some cases, the determination may include comparing the duration between the timing of the measurement report and the next CDRX ON period to a threshold (e.g., a threshold period of time) to determine whether the duration between the timing of the measurement report and the next CDRX ON period is greater than or equal to the threshold. The operations at block 1045 may be performed using the measurement reporting module 210, the timing determination module 310, and/or the CDRX interval evaluation module 410.

When it is determined at block 1045 that the duration between the timing of the measurement report and the next CDRX ON period does not satisfy the threshold, processing may proceed once again to block 1055, where the measurement report may be transmitted after expiration of the TTT timer (e.g., during a next CDRX ON period or during a CDRX ON period following the CDRX OFF period).

When it is determined at block 1045 that the duration between the timing of the measurement report and the next CDRX ON period does satisfy the threshold, the method 1000 may continue at block 1050. At block 1050, the timing of the measurement report may be modified in response to the determinations made at blocks 1015, 1025, and 1045. The modification of the timing may include transmitting the measurement report before the CDRX OFF period is entered. The operations at block 1050 may in some cases be performed using the measurement reporting module 210, the timing modification module 315, and/or the measurement report transmission module 320.

By transmitting the measurement report early, such as before expiration of the TTT timer and before entering the CDRX OFF period, the measurement report may be transmitted in a more timely manner than if its transmission were delayed until a next CDRX ON period. The timeliness of a measurement report may be of particular concern for certain kinds of measurement reports, such as mobility measurement reports.

In alternate aspects of the method 1000, the transmission of the measurement report at block 1050 may be made in response to one or none of the determinations made at blocks 1025 and 1045, or in response to alternate and/or additional determinations. However, an affirmative determination at block 1025 may increase the likelihood that the measurement report transmitted at block 1050 will contain a useful measurement (e.g., a measurement that has been maintained for a period of time, albeit less than the duration of the TTT timer). An affirmative determination at block 1045 may avoid the early transmission of a measurement report when the duration between the timing of the measurement report and the next CDRX ON period is short enough that it will not substantially delay the transmission of the measurement report.

Thus, the method 1000 may provide for transmitting a measurement report during wireless communications. It should be noted that the method 1000 is just one implementation and that the operations of the method 1000 may be rearranged or otherwise modified such that other implementations are possible.

In some cases, aspects of the methods 900 and 1000 may be combined.

Modifying a Low-Power Period

As described above, the timeless of measurement reports (MRs) may be important, for example, regarding handing over a UE from a source base station to a target base station. As will be described in more detail herein, an outdated measurement report received by the network (e.g., serving, source base station) may render the report of little value. During moderate to high mobility scenarios, an untimely transmission of a MR may cause the MR to be reported at the time of transmission. In such scenarios, the serving base station may make a handover decision regarding the UE based on measurements which are no longer accurate.

Prior to handing over a UE from a serving base station to a target base station, two measurements regarding the target base station (e.g., target cell) may be taken by the UE. A measurement may be taken at a TTT entry time and a TTT exit time. The entering condition or event of a TTT may be, for example, a measured reference signal received power (RSRP) or a measured reference signal received quality (RSRQ) of the target base station satisfying a threshold. The TTT exit time may occur upon expiration of a TTT timer.

A UE may process the TTT entry and TTT exit measurements and may transmit filtered measurements to the network in the form of a quantized MR. As described above, if a low-power period (e.g., CDRX OFF period) begins between TTT entry and TTT exit, the UE may transmit a MR after exiting the low-power state (e.g., when CDRX OFF period ends). During certain mobility scenarios, the delayed transmission of the MR by the UE may cause the network to make a handover decision based on inaccurate, outdated, or otherwise invalid information.

Figure 11:
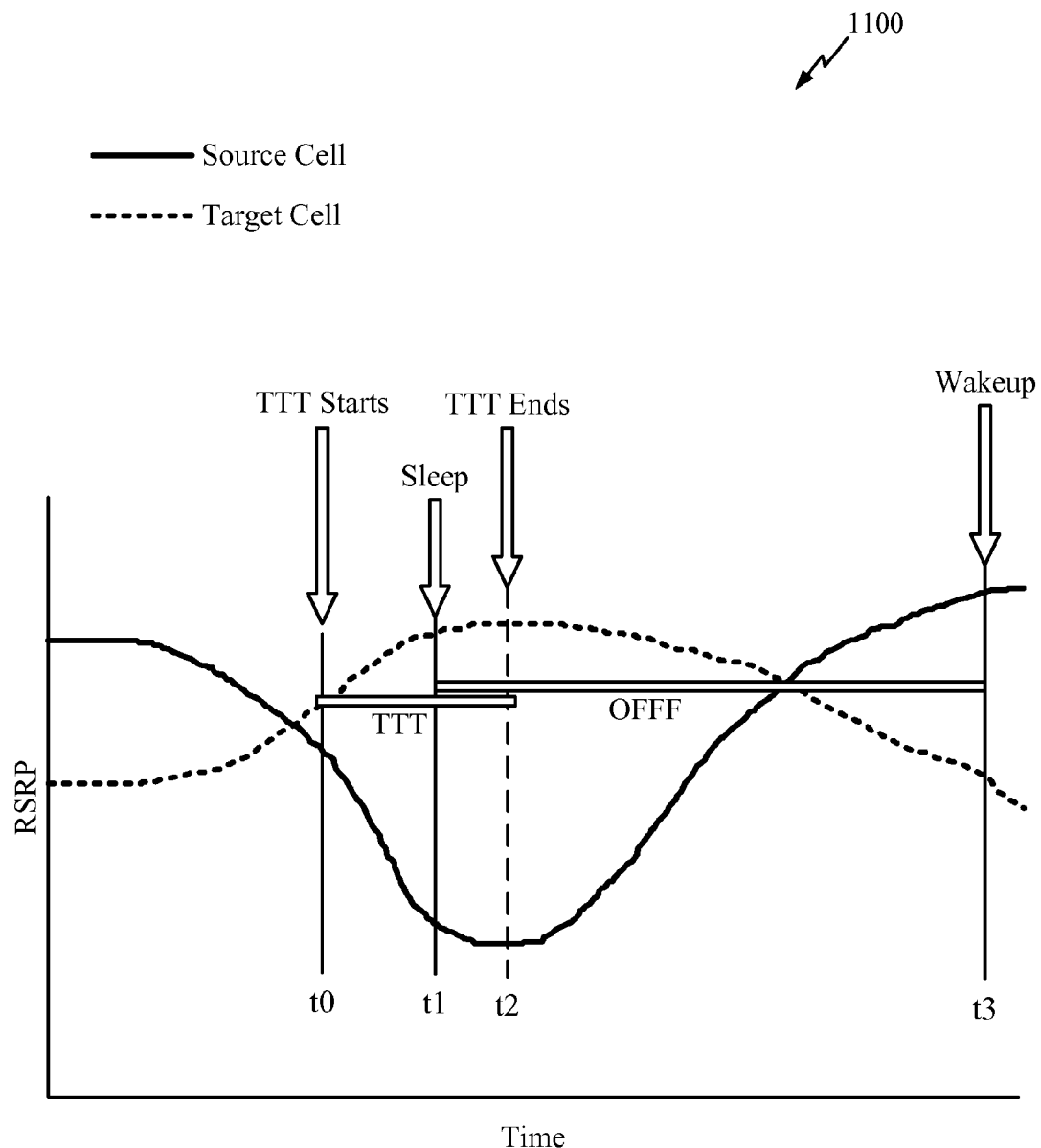
FIG. 11 illustrates an example of a UE transmitting a delayed measurement report, in accordance with aspects of the present disclosure.

FIG. 11 illustrates an example scenario 1100 where a UE transmits a delayed MR report. As shown in the FIG. 11, time is represented on the x-axis and RSRP is represented on the y-axis.

At $t_0$, a handover procedure from a source cell to a target cell may begin, as a RSRP of the target cell is higher than a RSRP of the source cell. Accordingly, at $t_0$, a measurement event timer (e.g., TTT timer) may begin and may be set to expire at $t_2$. Upon expiry of the measurement event timer, at $t_2$, the UE should timely transmit a MR to the source cell.

However, as illustrated a low-power period may begin between the beginning of the measurement event timer $t_0$ and the end of the measurement event timer $t_2$. For example, at $t_1$, a CDRX OFF period begins and transmissions by the UE may be suspended until the CDRX OFF period ends at $t_3$.

At $t_3$, the UE may wake up and transmit the now, potentially outdated MR to the network. Based, at least in part, on the MR, the network may handover the UE to the target cell, which has become weaker than the source cell. Aspects of the present disclosure provide methods and apparatus to address this conflict between the measurement event timer (e.g., TTT timer) and a low-power period (e.g., CDRX OFF period) at the UE in an effort to transmit more accurate, timely MRs to the source cell.

Figure 12:
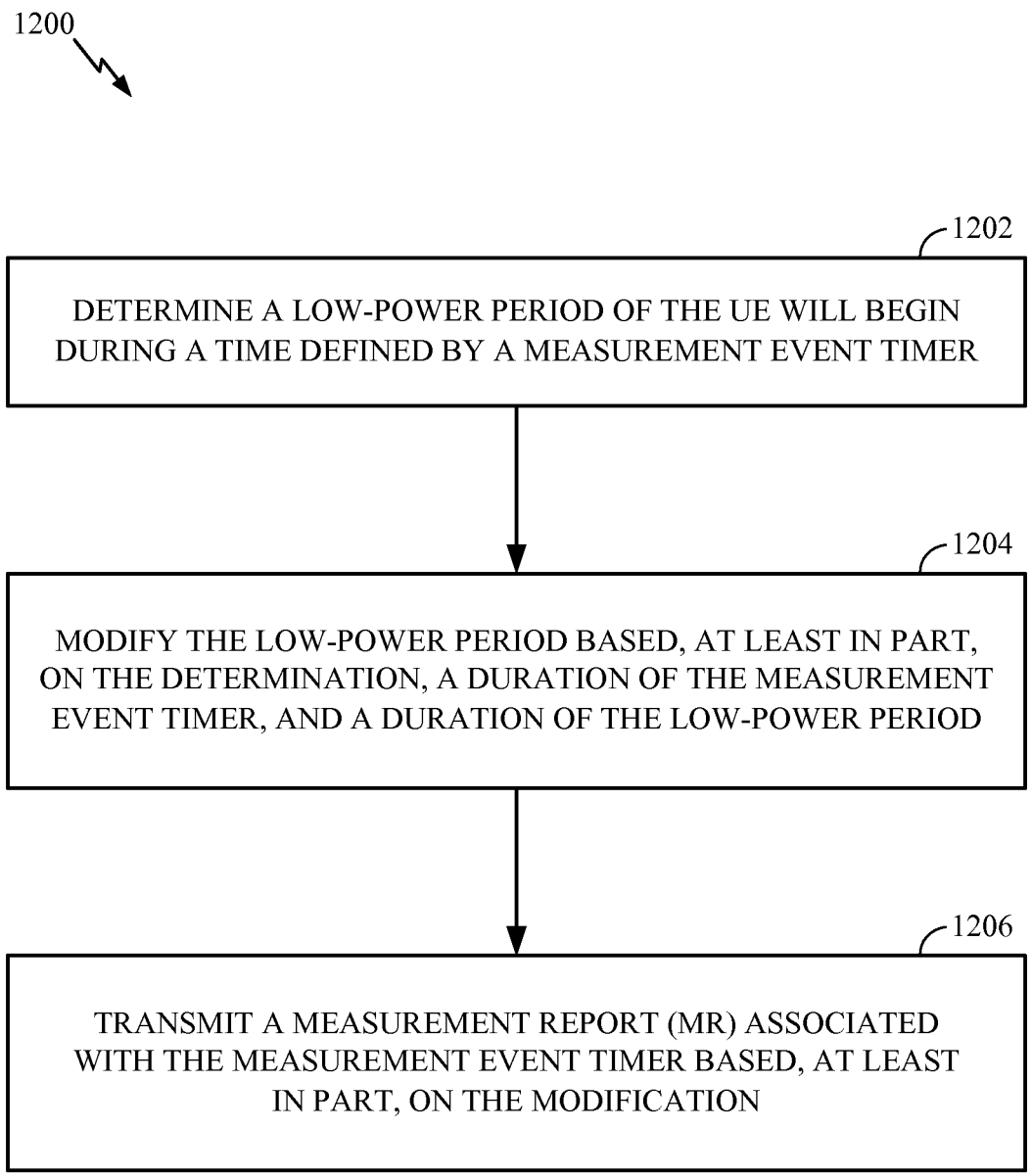
FIG. 12 illustrates example operations performed by a UE, in accordance with aspects of the present disclosure.

FIG. 12 illustrates example operations 1200, performed by a UE, according to aspects of the present disclosure. The UE may be UE 115 of FIG. 1 and may include one or more components illustrated in the accompanying figures. For example, a measurement reporting module 210, a timing determination module 310, TTT to CDRX interval comparison module 420, one or more transceiver modules 510, and antennas 505 may perform aspects described herein. Further, the processor module 525 and memory 515 may be configured to implement aspects of the present disclosure.

At 1202, the UE may determine that a low-power period will begin during a time defined by a measurement event timer. For example, the measurement reporting module 210 may detect an entering condition or event for triggering a measurement report and start a TTT timer. The entering condition or event may be, for example, a measured reference signal received power (RSRP) or a measured reference signal received quality (RSRQ) of a target cell satisfying a threshold. The comparison module 415 may be used to determine whether the timing of a measurement report associated with a measurement event occurs during the low-power period (e.g., during a CDRX OFF state).

As will be explained in more detail with reference to FIGS. 13 and 14, at 1204, the UE may modify the low-power period. The modification may be based, at least in part, on determining the low-power period of the UE begins during the time defined by the measurement event time, a duration of the measurement event timer, and a duration of the low-power period. According to aspects, modifying the low-power period may include one of delaying start of the low-power period (e.g., until after transmission of the MR) or skipping the low-power period.

At 1206, the UE may transmit a MR associated with the measurement event timer based, at least in part, on the modified low-power period.

According to aspects, modifying the low-power period includes prioritizing the measurement event timer over the low-power period. In this manner, the UE may transmit accurate, timely MRs to the network. The low-power period may be modified based, at least in part, on a difference between the duration of the measurement event timer and the duration of the low-power period. For example, the measurement event timer may be prioritized when it is shorter than the duration of the low-power period. As described herein, the measurement event timer may include a TTT timer and the low-power period may include a CDRX OFF period.

Prioritizing the measurement event timer over the low-power period may occur during moderate to high UE mobility scenarios. For example, when a mobility parameter of the UE exceeds a threshold that indicates the UE is in a moderate to high mobility state, timeliness of the MR may be prioritized over the low-power state of the UE. According to aspects, a mobility metric may be known to a UE via, for example, Doppler spread or channel time autocorrelation.

Figure 13:
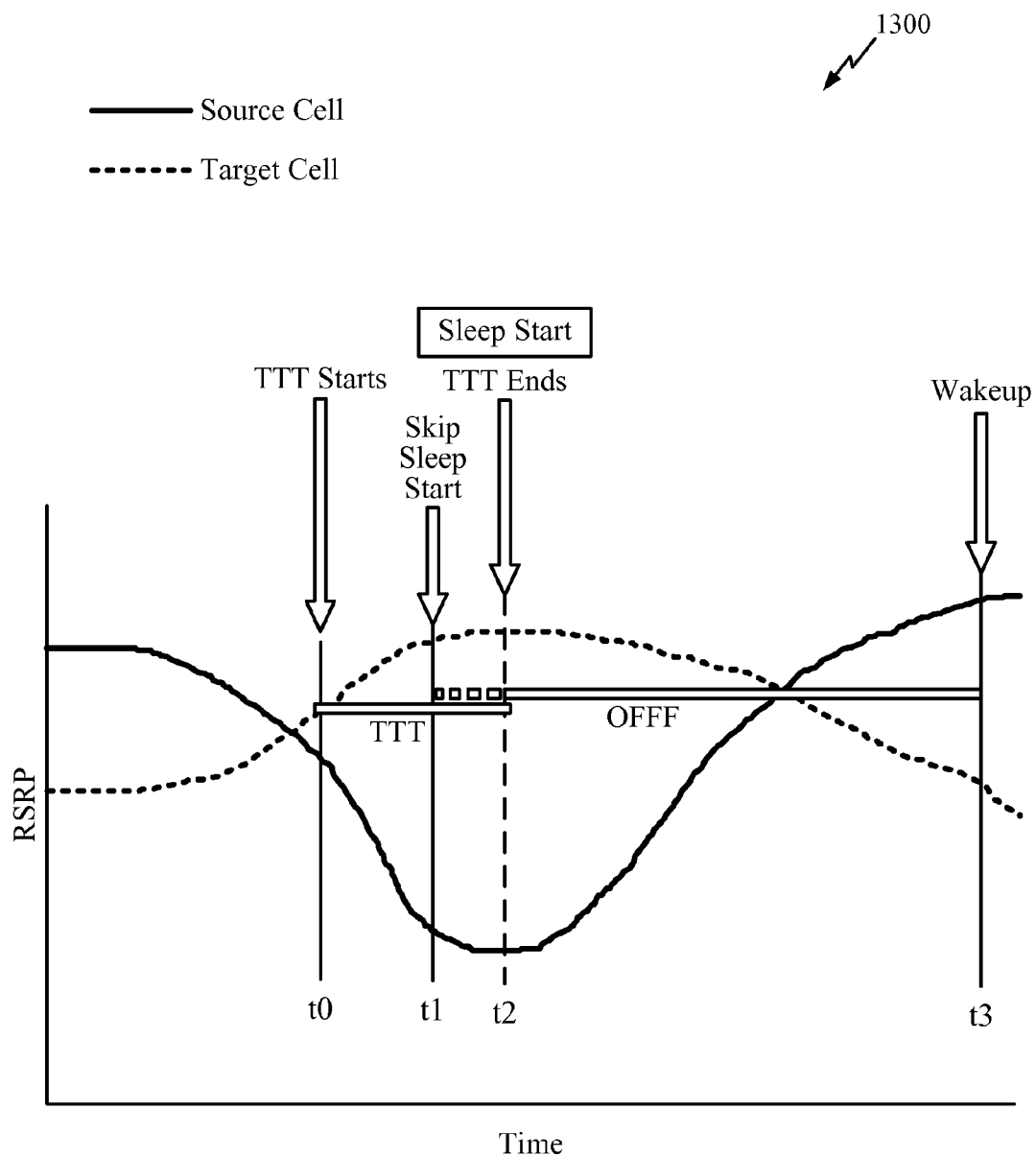
FIG. 13 illustrates an example of a UE prioritizing the measurement event timer over the low-power period by delaying start of the low-power, in accordance with aspects of the present disclosure.

FIG. 13 illustrates an example 1300 of delaying start of the low-power period upon determining that enough time remains in the low-power period after transmission of the MR for the UE to enter and exit the low-power period, according to aspects of the present disclosure.

At $t_0$, the RSRP of the target cell may be stronger than the RSRP of the source cell. Accordingly, a measurement event timer may begin at $t_0$ and may be set to expire at $t_2$. However, at $t_2$, the UE may be scheduled to be in a low-power state.

According to aspects, the UE may determine that the duration of the low-power period is substantially longer than the duration of the measurement event timer. In other words, the duration of the low-power period is long enough such that enough time remains for the UE to enter a low-power period (e.g., go to sleep) and exit the low-power period (e.g., wakeup) after expiry of the measurement event timer at $t_2$ and transmission of the associated MR report at $t_3$.

Thus, as illustrated in FIG. 13, the UE may delay start of the low-power period until $t_2$. At $t_2$, the UE may transmit the MR and may enter the low-power state. The UE may exit the low-power state, as originally scheduled, at $t_3$.

Figure 14:
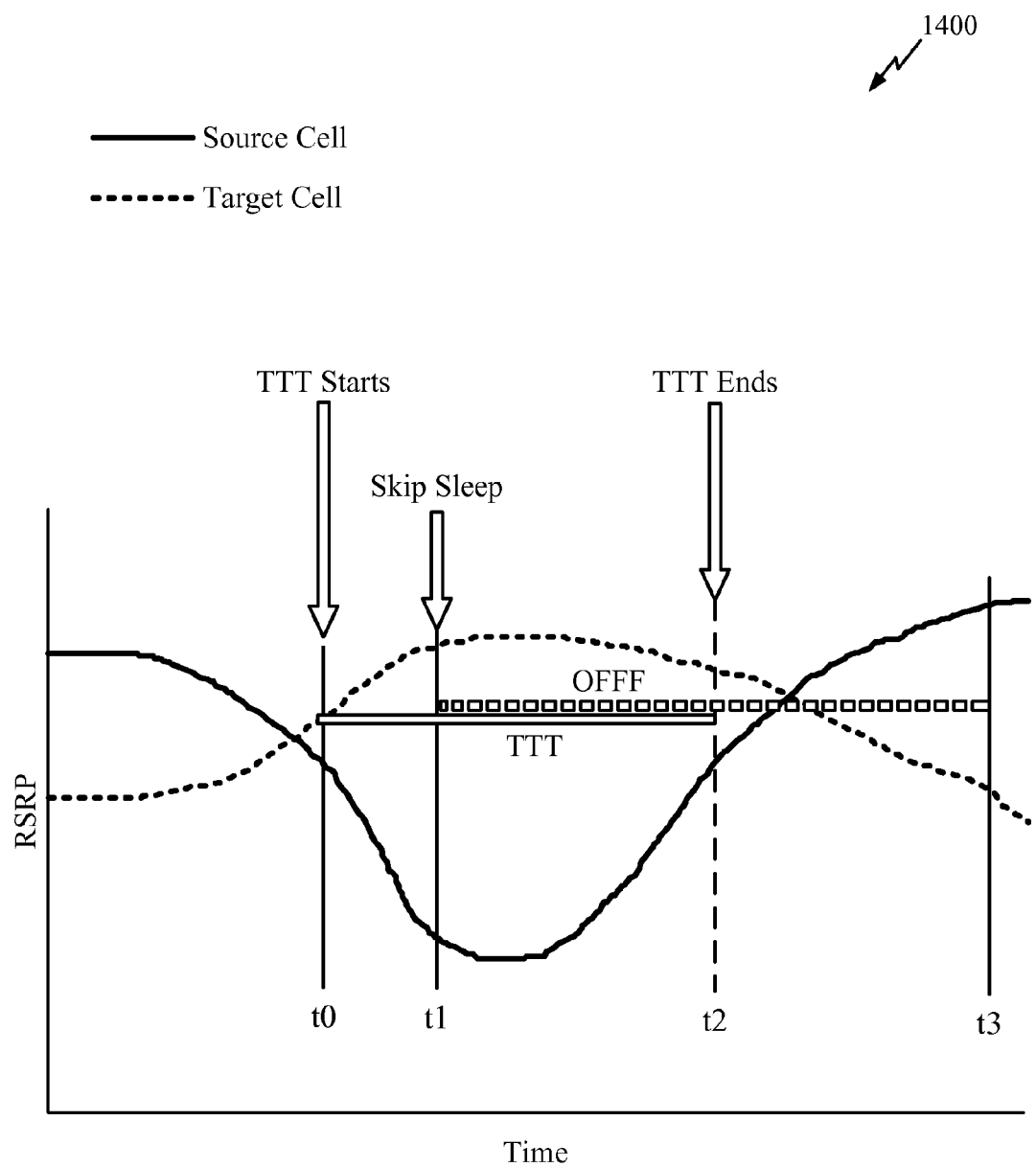
FIG. 14 illustrates an example of a UE prioritizing the measurement event timer over the low-power period by skipping a low-power period, in accordance with aspects of the present disclosure.

FIG. 14 illustrates an example 1400 of skipping the low-power period upon determining that enough time does not remain in the low-power period after transmission of the MR for the UE to enter and exit the low-power period, according to aspects of the present disclosure. As shown in FIG. 14, the difference between the duration of the low-power period and duration of the measurement event timer is less than the difference between the duration of the low-power period and duration of the measurement event timer illustrated in FIG. 13.

At $t_0$, the RSRP of the target cell may be stronger than the RSRP of the source cell. Accordingly, a measurement event timer may begin at $t_0$ and may be set to expire at $t_2$. However, at $t_2$, the UE may be scheduled to be in a low-power state.

As illustrated in FIG. 14, according to aspects, the UE may determine that it may not be practical for the UE to enter and exit the low-power state in the amount of time remaining in the low-power period after transmission of the MR upon expiry of the measurement event timer. For example, the UE may determine that enough time does not remain for the UE to enter and exit the low-power period between the scheduled end of the low-power period at $t_3$ and the transmission of the MR at $t_2$. Accordingly, the UE may prioritize the measurement event timer and skip this low-power period. By skipping the low-power period, a timely and more accurate MR may be transmitted to the source base station.

While RSRP is illustrated in FIGS. 11, 13, and 14, other signal measurements including RSRQ and/or SNR may be used to trigger a measurement event timer as part of a handover process.

Thus, as detailed herein, aspects of the present disclosure provide methods and apparatus for prioritizing a measurement event timer over a low-power period, when the low-power period is scheduled to begin during a time defined by the measurement event timer. The UE may modify the low-power period and in effort to transmit accurate, timely MRs to the network. Modifying the low-power period may include delaying the start of the low-power state until after transmission of the MR associated with the measurement event timer or skipping the low-power period.

As described with reference to FIG. 13, when the duration of the low-power period is substantially greater than the duration of the measurement event timer, the measurement event timer is continue to run, and the low-power period may begin upon expiry of the measurement event timer. As described with reference to FIG. 14, if the duration of the low-power period is greater than, but not substantially greater than the duration of the measurement event timer, enough time may not remain in the low-power state, after transmission of the MR, for the UE to enter and exit the low-power state. Thus, the UE may skip the sleep opportunity.

When the duration of the measurement event timer is greater than a duration of a low-power period, then no conflict exists. Accordingly, the UE may enter and exit the low-power state while the measurement event timer is running.

The detailed description set forth above in connection with the appended drawings describes exemplary aspects and does not represent the only embodiments/aspects that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS. LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. At the Physical layer, the transport channels may be mapped to Physical channels.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote light source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications by a user equipment (UE), comprising:
   determining a low-power period of the UE will begin during a time defined by a measurement event timer;

modifying the low-power period based, at least in part, on the determination, a duration of the measurement event timer, and a duration of the low-power period; and transmitting a measurement report (MR) associated with the measurement event timer based, at least in part, on the modification.

2. The method of claim 1, wherein modifying the low-power period comprises prioritizing the measurement event timer over the low-power period.

3. The method of claim 1, wherein the modifying is based, at least in part, on a difference between the duration of the measurement event timer and the duration of the low-power period.

4. The method of claim 1, wherein the duration of the measurement event timer is shorter than the duration of the low-power period.

5. The method of claim 1, wherein modifying the low-power period comprises:

delaying start of the low-power period until expiry of the measurement event timer upon determining enough time remains in the low-power period after transmission of the MR for the UE to enter and exit the low-power period.

6. The method of claim 1, wherein modifying the low-power period comprises:

skipping the low-power period when enough time does not remain in the low-power period after transmission of the MR for the UE to enter and exit the low-power period.

7. The method of claim 1, wherein the modifying occurs when a mobility parameter of the UE exceeds a threshold.

8. The method of claim 7, wherein the threshold indicates one of a moderate or high UE mobility scenario.

9. The method of claim 1, wherein the measurement event timer is a Time to Trigger (TTT) timer.

10. The method of claim 1, wherein the low-power period is a connected mode discontinuous reception (CRDX) OFF period.

11. An apparatus for wireless communications by a user equipment (UE), comprising:

means for determining a low-power period of the UE will begin during a time defined by a measurement event timer;

means for modifying the low-power period based, at least in part, on the determination, a duration of the measurement event timer, and a duration of the low-power period; and means for transmitting a measurement report (MR) associated with the measurement event timer based, at least in part, on the modification.

12. The apparatus of claim 11, wherein the means for modifying the low-power period comprises means for prioritizing the measurement event timer over the low-power period.

13. The apparatus of claim 11, wherein the means for modifying is based, at least in part, on a difference between the duration of the measurement event timer and the duration of the low-power period.

14. The apparatus of claim 11, wherein the duration of the measurement event timer is shorter than the duration of the low-power period.

15. The apparatus of claim 11, wherein the means for modifying the low-power period comprises:

means for delaying start of the low-power period until expiry of the measurement event timer upon determining enough time remains in the low-power period after transmission of the MR for the UE to enter and exit the low-power period.

16. The apparatus of claim 11, wherein the means for modifying the low-power period comprises:

means for skipping the low-power period when enough time does not remain in the low-power period after transmission of the MR for the UE to enter and exit the low-power period.

17. The apparatus of claim 11, wherein the means for modifying occurs when a mobility parameter of the UE exceeds a threshold.

18. The apparatus of claim 17, wherein the threshold indicates one of a moderate or high UE mobility scenario.

19. The apparatus of claim 11, wherein the measurement event timer is a Time to Trigger (TTT) timer.

20. The apparatus of claim 11, wherein the low-power period is a connected mode discontinuous reception (CRDX) OFF period.

21. An apparatus for wireless communications by a user equipment (UE), comprising at least one processor, a memory coupled to the at least one processor with instructions stored thereon, and a transmitter, wherein:

the at least one processor is configured to:

determine a low-power period of the UE will begin during a time defined by a measurement event timer; and modify the low-power period based, at least in part, on the determination, a duration of the measurement event timer, and a duration of the low-power period; and the transmitter is configured to:

transmit a measurement report (MR) associated with the measurement event timer based, at least in part, on the modification.

22. The apparatus of claim 21, wherein the at least one processor is configured to modify the low-power period by prioritizing the measurement event timer over the low-power period.

23. The apparatus of claim 21, wherein the at least one processor is configured to modify based, at least in part, on a difference between the duration of the measurement event timer and the duration of the low-power period.

24. The apparatus of claim 21, wherein the duration of the measurement event timer is shorter than the duration of the low-power period.

25. The apparatus of claim 21, wherein the at least one processor is configured to modify the low-power period by delaying start of the low-power period until expiry of the measurement event timer upon determining enough time remains in the low-power period after transmission of the MR for the UE to enter and exit the low-power period.

26. The apparatus of claim 21, wherein the at least one processor is configured to modify the low-power period by skipping the low-power period when enough time does not remain in the low-power period after transmission of the MR for the UE to enter and exit the low-power period.

27. A non-transitory computer readable medium for wireless communications having instructions stored thereon, the instructions executable by one or more processors for:

determining a low-power period of a user equipment (UE) will begin during a time defined by a measurement event timer;

modifying the low-power period based, at least in part, on the determination, a duration of the measurement event timer, and a duration of the low-power period; and transmitting a measurement report (MR) associated with the measurement event timer based, at least in part, on the modification.

28. The non-transitory computer readable medium of claim 27, wherein modifying the low-power period comprises prioritizing the measurement event timer over the low-power period.

29. The non-transitory computer readable medium of claim 27, wherein modifying the low-power period comprises:
  delaying start of the low-power period until expiry of the measurement event timer upon determining enough time remains in the low-power period after transmission of the MR for the UE to enter and exit the low-power period.

30. The non-transitory computer readable medium of claim 27, wherein modifying the low-power period comprises:
  skipping the low-power period when enough time does not remain in the low-power period after transmission of the MR for the UE to enter and exit the low-power period.

* * * * *